(12) United States Patent
Kurita et al.

(10) Patent No.: US 11,011,741 B2
(45) Date of Patent: May 18, 2021

(54) POSITIVE ELECTRODE ACTIVE MATERIAL FOR LITHIUM SECONDARY BATTERIES, POSITIVE ELECTRODE FOR LITHIUM SECONDARY BATTERIES, AND LITHIUM SECONDARY BATTERY

(71) Applicants: SUMITOMO CHEMICAL COMPANY, LIMITED, Tokyo (JP); TANAKA CHEMICAL CORPORATION, Fukui (JP)

(72) Inventors: Hiroyuki Kurita, Osaka (JP); Takashi Arimura, Ibaraki (JP); Yusuke Maeda, Fukui (JP); Kayo Matsumoto, Fukui (JP)

(73) Assignees: SUMITOMO CHEMICAL COMPANY, LIMITED, Tokyo (JP); TANAKA CHEMICAL CORPORATION, Fukui (JP)

( * ) Notice: Subject to any disclaimer, the term of this patent is extended or adjusted under 35 U.S.C. 154(b) by 173 days.

(21) Appl. No.: 16/466,974

(22) PCT Filed: Nov. 30, 2017

(86) PCT No.: PCT/JP2017/043082
§ 371 (c)(1),
(2) Date: Jun. 5, 2019

(87) PCT Pub. No.: WO2018/105490
PCT Pub. Date: Jun. 14, 2018

(65) Prior Publication Data
US 2021/0043917 A1 Feb. 11, 2021

(30) Foreign Application Priority Data

Dec. 7, 2016 (JP) .............................. JP2016-237695
Oct. 25, 2017 (JP) .............................. JP2017-206557

(51) Int. Cl.
*H01M 4/525* (2010.01)
*H01M 4/62* (2006.01)
(Continued)

(52) U.S. Cl.
CPC ............ *H01M 4/131* (2013.01); *C01G 53/50* (2013.01); *H01M 4/134* (2013.01); *H01M 4/505* (2013.01);
(Continued)

(58) Field of Classification Search
CPC ...... H01M 4/131; H01M 4/134; H01M 4/505; H01M 4/525; H01M 10/0525
See application file for complete search history.

(56) References Cited

U.S. PATENT DOCUMENTS

2010/0209771 A1* 8/2010 Shizuka ................ H01M 4/366
429/207
2011/0315918 A1 12/2011 Kawai et al.
(Continued)

FOREIGN PATENT DOCUMENTS

EP 3331069 A1 6/2018
EP 3370285 A1 9/2018
(Continued)

OTHER PUBLICATIONS

Extended European Search Report issued in corresponding European Patent Application No. 17879401.2-1106, dated Jul. 3, 2020.
(Continued)

*Primary Examiner* — Osei K Amponsah
(74) *Attorney, Agent, or Firm* — McDermott Will & Emery LLP

(57) ABSTRACT

A positive electrode active material for lithium secondary batteries, includes: a lithium composite metal compound containing secondary particles formed by aggregation of primary particles; and a lithium-containing tungsten oxide,
(Continued)

in which the lithium-containing tungsten oxide is present at least in interparticle spaces of the primary particles, and in a pore distribution of the positive electrode active material for lithium secondary batteries measured by a mercury intrusion method, a surface area of pores having a pore diameter in a range of 10 nm or more to 200 nm or less is 0.4 m$^2$/g or more and 3.0 m$^2$/g or less.

18 Claims, 2 Drawing Sheets

(51) Int. Cl.

| | | |
|---|---|---|
| *H01M 4/131* | (2010.01) |
| *H01M 4/485* | (2010.01) |
| *H01M 4/134* | (2010.01) |
| *H01M 4/505* | (2010.01) |
| *C01G 53/00* | (2006.01) |
| *H01M 10/0525* | (2010.01) |
| *H01M 4/02* | (2006.01) |

(52) U.S. Cl.
CPC ....... *H01M 4/525* (2013.01); *H01M 10/0525* (2013.01); *C01P 2002/74* (2013.01); *H01M 2004/021* (2013.01); *H01M 2004/028* (2013.01)

(56) References Cited

U.S. PATENT DOCUMENTS

| | | |
|---|---|---|
| 2014/0087263 A1 | 3/2014 | Matsumoto et al. |
| 2016/0372749 A1 | 12/2016 | Iida et al. |
| 2017/0054147 A1 | 2/2017 | Yokoyama et al. |
| 2017/0141384 A1 | 5/2017 | Kawakita et al. |
| 2017/0141391 A1 | 5/2017 | Jito et al. |
| 2017/0187031 A1 | 6/2017 | Kurita et al. |
| 2017/0194626 A1 | 7/2017 | Yamamura et al. |
| 2017/0237069 A1 | 8/2017 | Takamori et al. |
| 2017/0324080 A1 | 11/2017 | Tuduki et al. |
| 2017/0352885 A1 | 12/2017 | Kondo et al. |
| 2018/0159127 A1 | 6/2018 | Kurita et al. |
| 2018/0316008 A1 | 11/2018 | Arimura et al. |
| 2019/0020023 A1 | 1/2019 | Yokoyama et al. |

FOREIGN PATENT DOCUMENTS

| | | |
|---|---|---|
| EP | 3509143 A1 | 7/2019 |
| JP | 2008-305777 A | 12/2008 |
| JP | 2009-081130 A | 4/2009 |
| JP | 2009-238587 A | 10/2009 |
| JP | 2013-125732 A | 6/2013 |
| JP | 2015-043335 A | 3/2015 |
| JP | 2015-060656 A | 3/2015 |
| JP | 5701343 B2 | 4/2015 |
| JP | 2015-216105 A | 12/2015 |
| JP | 2016-127004 A | 7/2016 |
| JP | 2018-045758 A | 3/2018 |
| JP | 2018-045759 A | 3/2018 |
| WO | 2011/162157 A1 | 12/2011 |
| WO | 2012/165654 A1 | 12/2012 |
| WO | 2015/182665 A1 | 12/2015 |
| WO | 2015/199168 A1 | 12/2015 |
| WO | 2016/017093 A1 | 2/2016 |
| WO | 2016/031147 A1 | 3/2016 |
| WO | 2016/060105 A1 | 4/2016 |
| WO | 2016/084346 A1 | 6/2016 |
| WO | 2016/084930 A1 | 6/2016 |
| WO | 2016/195036 A1 | 12/2016 |
| WO | 2017/073682 A1 | 5/2017 |

OTHER PUBLICATIONS

International Search Report dated Jan. 9, 2018, issued in corresponding International Application No. PCT/JP2017/043082.

\* cited by examiner

POSITIVE ELECTRODE ACTIVE MATERIAL FOR LITHIUM SECONDARY BATTERIES, POSITIVE ELECTRODE FOR LITHIUM SECONDARY BATTERIES, AND LITHIUM SECONDARY BATTERY

CROSS REFERENCE

This application is the U.S. National Phase under 35 U.S.C. § 371 of International Application No. PCT/JP2017/043082, filed on Nov. 30, 2017, which claims the benefit of Japanese Application No. 2016-237695, filed on Dec. 7, 2016 and Japanese Application No. 2017-206557, filed on Oct. 25, 2017, the entire contents of each are hereby incorporated by reference.

TECHNICAL FIELD

The present invention relates to a positive electrode active material for lithium secondary batteries, a positive electrode for lithium secondary batteries, and a lithium secondary battery.

Priority is claimed on Japanese Patent Application No. 2016-237695, filed on Dec. 7, 2016, and Japanese Patent Application No. 2017-206557, filed on Oct. 25, 2017, the contents of which are incorporated herein by reference.

BACKGROUND ART

A lithium-containing transition metal oxide has been used as a positive electrode active material for lithium secondary batteries. Lithium secondary batteries are already in practical use not only for small power sources in mobile phone applications, notebook personal computer applications, and the like but also for medium-sized and large-sized power sources in automotive applications, power storage applications, and the like.

In order to improve the performance of a lithium secondary battery such as battery capacity, a lithium composite metal compound containing lithium, nickel, cobalt, and manganese is used as a positive electrode active material for lithium secondary batteries. Furthermore, in order to achieve low resistance and long life of the battery, it is beneficial to include tungsten in the positive electrode active material for lithium secondary batteries. For example, PTLs 1 to 4 describe methods of mixing a lithium salt and a tungsten compound.

CITATION LIST

Patent Literature

[PTL 1] Japanese Unexamined Patent Application, First Publication No. 2015-216105
[PTL 2] Japanese Unexamined Patent Application, First Publication No. 2016-127004
[PTL 3] Japanese Unexamined Patent Application, First Publication No. 2009-81130
[PTL 4] Japanese Unexamined Patent Application, First Publication No. 2008-305777

SUMMARY OF INVENTION

Technical Problem

In order to achieve low resistance and long life of a battery, it is beneficial to include tungsten in the positive electrode active material for lithium secondary batteries. However, in the mixing methods described in PTLs 1 to 4, tungsten adheres only to the surface of secondary particles of the positive electrode active material for lithium secondary batteries, and in this case, there is a problem in that particle cracking occurs after cycles.

The present invention has been made in view of the above circumstances, and an object thereof is to provide a positive electrode active material for lithium secondary batteries in which particle cracking after cycles is significantly suppressed, and a positive electrode for lithium secondary batteries and a lithium secondary battery using the same.

Solution to Problem

That is, the present invention includes the following inventions [1] to [8].

[1] A positive electrode active material for lithium secondary batteries, including: a lithium composite metal compound containing secondary particles formed by aggregation of primary particles; and a lithium-containing tungsten oxide, in which the lithium-containing tungsten oxide is present at least in interparticle spaces of the primary particles, and in a pore distribution of the positive electrode active material for lithium secondary batteries measured by a mercury intrusion method, a pore surface area of pores having a pore diameter in a range of 10 nm or more to 200 nm or less is 0.4 m²/g or more and 3.0 m²/g or less.

[2] The positive electrode active material for lithium secondary batteries according to [1], in which the lithium composite metal compound is expressed by Composition Formula (I).

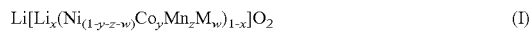

$$\mathrm{Li}[\mathrm{Li}_x(\mathrm{Ni}_{(1-y-z-w)}\mathrm{Co}_y\mathrm{Mn}_z\mathrm{M}_w)_{1-x}]\mathrm{O}_2 \qquad (I)$$

(in Composition Formula (I), $-0.1 \le x \le 0.2$, $0 < y \le 0.5$, $0 < z \le 0.8$, $0 \le w \le 0.1$, $1-y-z-w < 1$ and $y+z+w < 1$ are satisfied, and M represents one or more metals selected from the group consisting of Fe, Cu, Ti, Mg, Al, W, B, Mo, Nb, Zn, Sn, Zr, Ga, and V).

[3] The positive electrode active material for lithium secondary batteries according to [1] or [2], in which a crystallite size α of the lithium composite metal compound corresponding to a peak within a range of $2\theta=18.7\pm1°$ in powder X-ray diffraction measurement using CuKα radiation is 500 to 850 Å.

[4] The positive electrode active material for lithium secondary batteries according to any one of [1] to [3], in which, in the pore distribution of the positive electrode active material for lithium secondary batteries measured by the mercury intrusion method, a pore volume of pores having a pore diameter in a range of 10 nm or more and 200 nm or less is 0.01 mL/g or more and 0.06 mL/g or less.

[5] The positive electrode active material for lithium secondary batteries according to any one of [1] to [4], in which the lithium-containing tungsten oxide is at least one of $\mathrm{Li}_2\mathrm{WO}_4$ and $\mathrm{Li}_4\mathrm{WO}_5$.

[6] The positive electrode active material for lithium secondary batteries according to any one of [1] to [5], in which the lithium-containing tungsten oxide is present at primary particle boundaries of the lithium composite metal compound.

[7] A positive electrode for lithium secondary batteries including: the positive electrode active material for lithium secondary batteries according to any one of [1] to [6].

[8] A lithium secondary battery including: the positive electrode for lithium secondary batteries according to [7].

Advantageous Effects of Invention

According to the present invention, it is possible to provide a positive electrode active material for lithium secondary batteries in which particle cracking after cycles is significantly suppressed, and a positive electrode for lithium secondary batteries and a lithium secondary battery using the same.

DESCRIPTION OF EMBODIMENTS

Figure 1A:
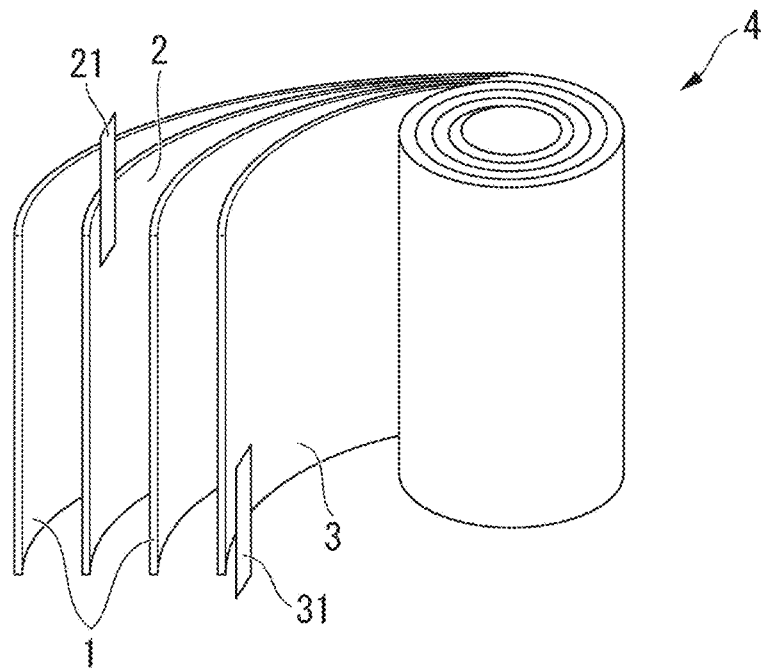
FIG. 1A is a schematic configuration view illustrating an example of a lithium-ion secondary battery.

<Positive Electrode Active Material for Lithium Secondary Batteries>

A positive electrode active material for lithium secondary batteries according to an aspect of the present invention includes: a lithium composite metal compound containing secondary particles formed by aggregation of primary particles; and a lithium-containing tungsten oxide, in which the lithium-containing tungsten oxide is present at least in interparticle spaces of the primary particles, and in a pore distribution of the positive electrode active material for lithium secondary batteries measured by a mercury intrusion method, a pore surface area of pores having a pore diameter in a range of 10 nm or more to 200 nm or less is 0.4 $m^2/g$ or more and 3.0 $m^2/g$ or less.

In the present specification, "primary particles" are the smallest units observed as independent particles by SEM, and the particles are single crystals or polycrystals in which crystallites are aggregated.

In the present specification, "secondary particles" are particles formed by aggregation of primary particles and can be observed by SEM.

In the present specification, aggregation of primary particles means that the primary particles are aggregated so as to have interparticle spaces therebetween.

In the present specification, "the lithium-containing tungsten oxide is present at least in interparticle spaces of the primary particles" means that the lithium-containing tungsten oxide is present in at least a part of the interparticle spaces of the primary particles, and the lithium-containing tungsten oxide may not be present in the interparticle spaces of all the primary particles.

(Requirement 1)

The positive electrode active material for lithium secondary batteries of the present embodiment includes the lithium composite metal compound containing the secondary particles formed by aggregation of the primary particles. The secondary particles have interparticle spaces (voids) between the primary particles, and the interparticle spaces are dispersed throughout the secondary particles. The positive electrode active material for lithium secondary batteries of the present embodiment contains the lithium-containing tungsten oxide present at least in the interparticle spaces of the primary particles of the lithium composite metal compound.

The presence of the lithium-containing tungsten oxide at least in the interparticle spaces of the primary particles of the lithium composite metal compound makes it possible to significantly suppress cracking of the particles of the lithium composite metal compound after cycles of a lithium secondary battery using the positive electrode active material for lithium secondary batteries of the present embodiment. That is, the presence of the lithium-containing tungsten oxide at least in the interparticle spaces of the primary particles of the lithium composite metal compound makes it possible to significantly suppress cracking of the particles of the lithium composite metal compound that may occur in a case where the lithium secondary battery using the positive electrode active material for lithium secondary batteries of the present embodiment is repeatedly charged and discharged.

In the present embodiment, the lithium-containing tungsten oxide may be present in the interparticle spaces of the primary particles of the lithium composite metal compound, the lithium-containing tungsten oxide may be present so as to fill the interparticle spaces of the primary particles of the lithium composite metal compound, and the lithium-containing tungsten oxide may be present on primary particle surfaces of the interparticle spaces of the primary particles of the lithium composite metal compound. In addition, the lithium-containing tungsten oxide may be present on the surface of the secondary particles of the lithium composite metal compound.

Furthermore, it is preferable that the lithium-containing tungsten oxide be present at primary particle boundaries of the lithium composite metal compound. In the present embodiment, the "primary particle boundaries" mean interfaces where the primary particles of the lithium composite metal compound are in contact. In other words, "the lithium-containing tungsten oxide is present at primary particle boundaries of the lithium composite metal compound" means that the lithium-containing tungsten oxide is positioned between at least two primary particles of the lithium composite metal compound and is in contact with the at least two primary particles.

Whether or not the positive electrode active material for lithium secondary batteries satisfies (requirement 1) can be confirmed, for example, by observing the positive electrode active material for lithium secondary batteries with a transmission electron microscope. In addition, the presence of the lithium-containing tungsten oxide can be confirmed by confirming the composition by X-ray photoelectron spectroscopy (XPS) analysis, X-ray absorption fine structure (XAFS) analysis, or the like, which will be described later.

(Requirement 2)

Pore Distribution by Mercury Intrusion Method

In the positive electrode active material for lithium secondary batteries of the present embodiment, in the pore distribution of the positive electrode active material for lithium secondary batteries measured by the mercury intrusion method, the surface area of pores having a pore diameter in a range of 10 nm or more to 200 nm or less is 0.4 $m^2/g$ or more and 3.0 $m^2/g$ or less.

From the viewpoint of further enhancing the effects of the present invention, the upper limit of the pore surface area is more preferably 2.8 $m^2/g$ or less, and even more preferably 2.5 $m^2/g$ or less. The lower limit of the pore surface area is more preferably 0.5 $m^2/g$ or more, and even more preferably 0.6 m²/g or more. The upper limit and the lower limit of the pore surface area can be randomly combined. For example, the pore surface area is more preferably 0.5 m²/g or more and 2.8 m²/g or less, and even more preferably 0.6 m²/g or more and 2.5 m²/g or less.

From the viewpoint of improving the output characteristics of the lithium secondary battery using the positive electrode active material for lithium secondary batteries of the present embodiment, it is preferable that the pore volume of pores having a pore diameter in a range of 10 nm or more and 200 nm or less be 0.01 mL/g or more and 0.06 mL/g or less. The upper limit of the pore volume is more preferably 0.059 mL/g or less, particularly preferably 0.058 mL/g or less. The lower limit of the pore volume is more preferably 0.012 mL/g or more, and particularly preferably 0.015 mL/g or more. The upper limit and the lower limit can be randomly combined. For example, the pore volume is more preferably 0.012 mL/g or more and 0.059 mL/g or less, and particularly preferably 0.015 mL/g or more and 0.058 mL/g or less.

In the present embodiment, the pore surface area and pore volume of the positive electrode active material for lithium secondary batteries can be obtained by the following method.

First, the inside of a container in which a sample is put is evaluated and the container is then filled with mercury. Mercury has a high surface tension, and as it is, mercury does not intrude into the pores of the surface of the sample. However, when a pressure is applied to mercury and the pressure is gradually increased, mercury gradually intrudes into the pores in order from pores having larger diameters to pores having smaller diameters. When the amount of mercury intruded into the pores is detected while the pressure is continuously increased, a mercury intrusion curve can be obtained from the relationship between the pressure applied to mercury and the amount of mercury intruded. Here, assuming that the shape of the pore is cylindrical, the pressure applied to mercury is P, the pore diameter thereof is D, the surface tension of mercury is α, and the contact angle between mercury and the sample is θ, the pore diameter is represented by Formula (A).

$$D = -4\alpha \times \cos\theta / P \quad (A)$$

Since α and θ are constants, the relationship between the applied pressure P and the pore diameter D can be obtained from Formula (A), and the pore surface area and the pore volume can be derived by measuring the volume of mercury intruded at that time.

That is, since there is a correlation between the pressure P applied to the mercury and the diameter D of the pore into which the mercury intrudes, based on the mercury intrusion curve obtained, a pore distribution curve that represents the relationship between the size of the pore radius of the sample and the volume thereof can be obtained. The approximate measurement limit of the pore diameter by the mercury intrusion method is about 2 nm as the lower limit and about 200 μm as the upper limit. The measurement by the mercury intrusion method can be performed using an apparatus such as a mercury porosimeter. Specific examples of the mercury porosimeter include Autopore III9420 (manufactured by Micromeritics Instrument Corporation). Examples of the measurement conditions include a measurement pressure of 1.07 psia to 59256.3 psia (7.3776 kPaA to 408.467 MPaA) at a measurement temperature of 25° C.

In the present embodiment, it is preferable that the lithium composite metal compound be represented by Composition Formula (I).

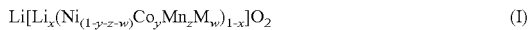

$$Li[Li_x(Ni_{(1-y-z-w)}Co_yMn_zM_w)_{1-x}]O_2 \quad (I)$$

(in Composition Formula (I), −0.1≤x≤0.2, 0<y≤0.5, 0<z≤0.8, 0≤w≤0.1, 1−y−z−w<1 and y+z+w<1 are satisfied, and M represents one or more metals selected from the group consisting of Fe, Cu, Ti, Mg, Al, W, B, Mo, Nb, Zn, Sn, Zr, Ga, and V.)

From the viewpoint of obtaining a positive electrode active material for lithium secondary batteries having high cycle characteristics, x in Composition Formula (I) is preferably more than 0, more preferably 0.01 or more, and even more preferably 0.02 or more. In addition, from the viewpoint of obtaining a positive electrode active material for lithium secondary batteries having higher initial Coulombic efficiency, x in Composition Formula (I) is preferably 0.1 or less, more preferably 0.08 or less, and even more preferably 0.06 or less.

The upper limit and the lower limit of x can be randomly combined. For example, x is preferably more than 0 and 0.1 or less, more preferably 0.01 or more and 0.08 or less, and even more preferably 0.02 or more and 0.06 or less.

In the present specification, "having high cycle characteristics" means that the discharge capacity retention ratio is high.

In addition, from the viewpoint of obtaining a positive electrode active material for lithium secondary batteries having a high discharge capacity, y in Composition Formula (I) is preferably 0.10 or more, more preferably 0.20 or more, and more preferably 0.30 or more. In addition, from the viewpoint of obtaining a positive electrode active material for lithium secondary batteries having high thermal stability, y in Composition Formula (I) is preferably 0.49 or less, more preferably 0.48 or less, and even more preferably 0.47 or less.

The upper limit and the lower limit of y can be randomly combined. For example, y is preferably 0.10 or more and 0.49 or less, more preferably 0.20 or more and 0.48 or less, and even more preferably 0.30 or more and 0.47 or less.

In addition, from the viewpoint of obtaining a positive electrode active material for lithium secondary batteries having a high discharge capacity at a high current rate, z in Composition Formula (I) is preferably 0.01 or more, more preferably 0.02 or more, and even more preferably 0.10 or more. In addition, from the viewpoint of obtaining a positive electrode active material for lithium secondary batteries having a high discharge capacity, z in Composition Formula (I) is preferably 0.38 or less, more preferably 0.36 or less, and even more preferably 0.25 or less.

The upper limit and the lower limit of z can be randomly combined. For example, z is preferably 0.01 or more and 0.38 or less, more preferably 0.02 or more and 0.36 or less, and even more preferably 0.10 or more and 0.25 or less.

In addition, from the viewpoint of obtaining a positive electrode active material for lithium secondary batteries having high cycle characteristics, w in Composition Formula (I) is preferably 0.01 or more, more preferably 0.03 or more, and more preferably 0.05 or more. In addition, from the viewpoint of obtaining a positive electrode active material for lithium secondary batteries having high storage characteristics at high temperatures (for example, in an environment at 60° C.), w in Composition Formula (I) is preferably 0.09 or less, more preferably 0.08 or less, and even more preferably 0.07 or less.

The upper limit and the lower limit of w can be randomly combined. For example, w is preferably 0.01 or more and 0.09 or less, more preferably 0.03 or more and 0.08 or less, and even more preferably 0.05 or more and 0.07 or less.

M in Composition Formula (I) represents one or more metals selected from the group consisting of Fe, Cu, Ti, Mg, Al, W, B, Mo, Nb, Zn, Sn, Zr, Ga, and V.

Furthermore, M in Composition Formula (I) is preferably one or more metals selected from the group consisting of Ti, B, Mg, Al, W, and Zr from the viewpoint of obtaining a positive electrode active material for lithium secondary batteries having high cycle characteristics, and is preferably one or more metals selected from the group consisting of B, Al, and Zr from the viewpoint of obtaining a positive electrode active material for lithium secondary batteries having high thermal stability.

Crystallite Size

In the present embodiment, it is preferable that a crystallite size α of the lithium composite metal compound corresponding to a diffraction peak within a range of 2θ=18.7±1° in powder X-ray diffraction measurement using CuKα radiation be 500 Å to 850 Å.

First, regarding the lithium composite metal compound of the positive electrode active material for lithium secondary batteries, a diffraction peak (hereinafter, sometimes referred to as peak A') in a range of 2θ=18.7±1° in powder X-ray diffraction measurement using CuKα radiation is determined.

Furthermore, the half-width A of the determined peak A' is calculated, and the crystallite size can be calculated by using the Scherrer equation D=Kλ/B cos θ (D: crystallite size, K: Scherrer constant, B: peak width, and θ: Bragg angle). Calculation of a crystallite size by the above equation is a method hitherto used (for example, refer to "X-ray structure analysis, determining arrangement of atoms" issued Apr. 30, 2002, Third Edition, Yoshio Waseda, MATSUBARA, EIICHIRO).

In the present embodiment, the crystallite size α is more preferably 550 Å or more, and particularly preferably 570 Å or more. In addition, 820 Å or less is more preferable, and 800 Å or less is particularly preferable.

The upper limit and the lower limit of the crystallite size α can be randomly combined. For example, the crystallite size α is more preferably 550 Å or more and 820 Å or less, and particularly preferably 570 Å or more and 800 Å or less.

In addition, in the powder X-ray diffraction measurement using CuKα radiation, it is preferable that the crystallite size β of the lithium composite metal compound corresponding to a diffraction peak (hereinafter sometimes referred to as peak B') within a range of 2θ=4 4.6±1° be 200 Å to 500 Å.

The upper limit of the crystallite size β is more preferably 490 Å or less, and particularly preferably 480 Å or less. The lower limit of the crystallite size β is more preferably 250 Å or more, particularly preferably 300 Å or more.

The upper limit and the lower limit of the crystallite size β can be randomly combined. For example, the crystallite size β is more preferably 250 Å or more and 490 Å or less, and particularly preferably 300 Å or more and 480 Å or less.

In the present embodiment, it is preferable that the lithium-containing tungsten oxide be at least one of $Li_2WO_4$ and $Li_4WO_5$.

The composition of the lithium-containing tungsten oxide present in the positive electrode active material for lithium secondary batteries can be confirmed by X-ray photoelectron spectroscopy (XPS) analysis, X-ray absorption fine structure (XAFS) analysis, or the like.

In XPS analysis, the constituent elements of a sample and their electronic states can be analyzed by measuring the photoelectron energy generated by irradiating the surface of the sample with X-rays. In a commercially available XPS analyzer, for example, Al-Kα radiation, Mg-Kα radiation, or the like is used as soft X-rays. In XAFS analysis, information of atom of interest such as local structures (for example, the valence of the atom, types of adjacent atoms, and bonding properties) can be acquired by measuring and analyzing the ratio ($I/I_0$) of the X-ray intensity ($I_0$) before irradiation of a measurement object to the X-ray intensity (I) after transmission through the measurement object. Measurement can be performed using the beamline of a synchrotron radiation facility. The composition analysis of the lithium-containing tungsten oxide can be performed by performing the analysis as described above.

In the present embodiment, the tungsten content in the lithium-containing tungsten oxide contained in the positive electrode active material for lithium secondary batteries is, with respect to the total molar amount of transition metals of the positive electrode active material for lithium secondary batteries, preferably 0.01 mol % or more and 0.9 mol % or less, and more preferably 0.2 mol % or more and 0.8 mol % or less. When the tungsten content in the lithium-containing tungsten oxide is 0.01 mol % or more with respect to the total molar amount of the transition metals of the positive electrode active material for lithium secondary batteries, it is possible to suppress particle cracking in the lithium secondary battery having the positive electrode active material for lithium secondary batteries after cycles. When the tungsten content in the lithium-containing tungsten oxide is 0.9 mol % or less with respect to the total molar amount of the transition metals of the positive electrode active material for lithium secondary batteries, it is possible to increase the discharge capacity in the lithium secondary battery having the positive electrode active material for lithium secondary batteries.

(BET Specific Surface Area)

In the present embodiment, from the viewpoint of obtaining a positive electrode active material for lithium secondary batteries having a high discharge capacity at a high current rate, the BET specific surface area ($m^2/g$) is preferably 0.1 $m^2/g$ or more, preferably 0.3 $m^2/g$ or more, and even more preferably 0.5 $m^2/g$ or more. In addition, from the viewpoint of reducing the hygroscopicity of the positive electrode active material for lithium secondary batteries, the BET specific surface area ($m^2/g$) of the positive electrode active material is preferably 4.0 $m^2/g$ or less, and more preferably 3.8 $m^2/g$ or less, and even more preferably 3.0 $m^2/g$ or less.

The upper limit and the lower limit of the BET specific surface area ($m^2/g$) of the positive electrode active material for lithium secondary batteries can be randomly combined. For example, the BET specific surface area of the positive electrode active material for lithium secondary batteries is preferably 0.1 $m^2/g$ or more and 4.0 $m^2/g$ or less, more preferably 0.3 $m^2/g$ or more and 3.8 $m^2/g$ or less, and even more preferably 0.5 $m^2/g$ or more and 3.0 $m^2/g$ or less.

The BET specific surface area of the positive electrode active material for lithium secondary batteries can be measured by using a BET specific surface area measuring device (Macsorb (registered trademark) manufactured by MOUNTECH Co., Ltd.) after drying 1 g of the powder of the positive electrode active material for lithium secondary batteries in a nitrogen atmosphere at 105° C. for 30 minutes.

(Layered Structure)

The crystal structure of the positive electrode active material for lithium secondary batteries is a layered structure, and more preferably a hexagonal crystal structure or a monoclinic crystal structure.

The hexagonal crystal structure belongs to any one space group selected from the group consisting of P3, $P3_1$, $P3_2$, R3, P-3, R-3, P312, P321, $P3_112$, $P3_121$, $P3_212$, $P3_221$, R32, P3 m1, P31m, P3c1, P31c, R3m, R3c, P-31m, P-31c, P-3 m1, P-3c1, R-3m, R-3c, P6, $P6_1$, $P6_5$, $P6_2$, $P6_4$, $P6_3$, P-6, P6/m, $P6_3$/m, P622, $P6_122$, $P6_522$, $P6_222$, $P6_422$, $P6_322$, P6 mm, P6cc, $P6_3$ cm, $P6_3$mc, P-6m2, P-6c2, P-62m, P-62c, P6/mmm, P6/mcc, $P6_3$/mcm, and $P6_3$/mmc.

In addition, the monoclinic crystal structure belongs to any one space group selected from the group consisting of P2, $P2_1$, C2, Pm, Pc, Cm, Cc, P2/m, $P2_1$/m, C2/m, P2/c, $P2_1$/c, and C2/c.

Among these, from the viewpoint of obtaining a positive electrode active material for lithium secondary batteries having a high discharge capacity, the crystal structure is particularly preferably a hexagonal crystal structure belonging to the space group R-3m, or a monoclinic crystal structure belonging to C2/m.

<Manufacturing Method of Positive Electrode Active Material for Lithium Secondary Batteries>

A manufacturing method of the positive electrode active material for lithium secondary batteries of the present embodiment is preferably a method including a step of spraying and mixing step including heating a composite metal compound powder containing nickel, cobalt, and manganese, spraying an alkaline solution in which a tungsten compound is dissolved onto the composite metal compound powder, and performing mixing thereon to form a mixed powder, and cooling the mixed powder and a step of manufacturing a lithium composite metal compound including mixing a lithium salt with the mixed powder and calcining the mixture.

In the manufacturing method of the positive electrode active material for lithium secondary batteries, it is preferable that a composite metal compound containing essential metals including metals other than lithium, that is, Ni, Co, and Mn and an optional metal including one or more of Fe, Cu, Ti, B, Mg, Al, W, Mo, Nb, Zn, Sn, Zr, Ga, and V be first prepared, and the composite metal compound be calcined with an appropriate lithium salt. The optional metal is a metal optionally contained in the composite metal compound as desired, and the optional metal may not be contained in the composite metal compound in some cases. As the composite metal compound, a composite metal hydroxide or a composite metal oxide is preferable.

More specifically, the manufacturing method of the positive electrode active material for lithium secondary batteries includes a step of manufacturing the composite metal compound having the spraying and mixing step and a step of manufacturing the lithium composite metal compound.

Hereinafter, each process of the manufacturing method of the lithium composite metal compound will be described.

[Step of Manufacturing Composite Metal Compound]

The step of manufacturing the composite metal compound is a step of preparing a composite metal compound containing essential metals including metals other than lithium, that is, Ni, Co, and Mn and an optional metal including one or more of Fe, Cu, Ti, B, Mg, Al, W, Mo, Nb, Zn, Sn, Zr, Ga, and V.

The composite metal compound can be produced by a generally known batch coprecipitation method or continuous coprecipitation method. Hereinafter, the manufacturing method will be described in detail, taking a composite metal hydroxide containing nickel, cobalt, manganese as metals and an optional metal M as an example.

First, by a coprecipitation method, particularly a continuous method described in Japanese Unexamined Patent Application, First Publication No. 2002-201028, a nickel salt solution, a cobalt salt solution, a manganese salt solution, an M salt solution, and a complexing agent are reacted, whereby a composite metal hydroxide expressed by $Ni_{(1-y-z-w)}Co_yMn_zM_w(OH)_2$ (in the formula, $0<y\leq0.5$, $0<z\leq0.8$, $0\leq w\leq0.1$, $1-y-z-w<1$, $y+z+w<1$) is manufactured.

The nickel salt as a solute of the nickel salt solution is not particularly limited, and for example, any of nickel sulfate, nickel nitrate, nickel chloride, and nickel acetate can be used. As a cobalt salt as a solute of the cobalt salt solution, for example, any of cobalt sulfate, cobalt nitrate, and cobalt chloride can be used. As a manganese salt as a solute of the manganese salt solution, for example, any of manganese sulfate, manganese nitrate, and manganese chloride can be used. As an M salt as a solute of the M salt solution, for example, any of M sulfate, M nitrate, M chloride, and M acetate can be used. The above metal salts are used at a ratio corresponding to the composition ratio of the $Ni_{(1-y-z-w)}Co_yMn_zM_w(OH)_2$. That is, the molar ratio of nickel, cobalt, manganese, and M in the mixed solution containing the above metal salts defines the amount of each of the metal salts so as to correspond to (1-y-z-w):y:z:w in Composition Formula (I) of the lithium composite metal compound. Also, water is used as a solvent.

The complexing agent is capable of forming a complex with ions of nickel, cobalt, and manganese in an aqueous solution, and examples thereof include ammonium ion donors (ammonium sulfate, ammonium chloride, ammonium carbonate, ammonium fluoride, and the like), hydrazine, ethylenediaminetetraacetic acid, nitrilotriacetic acid, uracildiacetic acid, and glycine. The complexing agent may not be contained, and in a case where the complexing agent is contained, the amount of the complexing agent contained in the mixed solution containing the nickel salt solution, the cobalt salt solution, the manganese salt solution, the M salt solution, and the complexing agent is, for example, more than 0 and 2.0 or less in terms of molar ratio to the sum of the number of moles of the metal salts.

During the precipitation, an alkali metal hydroxide (for example, sodium hydroxide, or potassium hydroxide) is added, if necessary, in order to adjust the pH value of the aqueous solution.

When the complexing agent in addition to the nickel salt solution, the cobalt salt solution, the manganese salt solution, and the M salt solution is continuously supplied to a reaction tank, nickel, cobalt, manganese, and M react, whereby $Ni_{(1-y-z-w)}Co_yMn_zM_w(OH)_2$ is manufactured. During the reaction, the temperature of the reaction tank is controlled to be, for example, 20° C. or more and 80° C. or less, and preferably in a range of 30° C. to 70° C., and the pH value in the reaction tank (when measured at 40° C.) is controlled to be, for example, a pH of 9 or more and a pH of 13 or less, and preferably in a range of a pH of 11 to 13 such that the materials in the reaction tank are appropriately stirred. The reaction tank is of a type that allows the formed reaction precipitate to overflow for separation.

By appropriately controlling the concentrations of the metal salts supplied to the reaction tank, the stirring speed, the reaction temperature, the reaction pH, calcining conditions, which will be described later, and the like, it is possible to control various physical properties such as the pore diameter and the BET specific surface area described in the above requirements of a lithium composite metal oxide, which is finally obtained in the following steps. In particular, in order to realize desired pore diameter, pore surface area, pore volume, crystallite size, in addition to the control of the above conditions, bubbling by various gases, such as inert gases including nitrogen, argon, and carbon dioxide and oxidizing gases including air and oxygen, or a mixed gas thereof may be used in combination. To promote the oxidation state, in addition to the gases, peroxides such as hydrogen peroxide, peroxide salts such as permanganate, perchlorate, hypochlorite, nitric acid, halogen, ozone, and the like can be used. To promote the reduction state, in addition to the gases, organic acids such as oxalic acid and formic acid, sulfites, hydrazine, and the like can be used.

For example, when the reaction pH in the reaction tank is increased, the primary particle diameter of the composite metal compound decreases, and a composite metal compound having a high BET specific surface area is easily obtained. Specifically, when the reaction pH in the reaction tank is set to 11.0 or more, the primary particle diameter of the composite metal compound decreases, and a composite metal compound having a high BET specific surface area is easily obtained. On the other hand, when the reaction pH is reduced, a composite metal compound having a low BET specific surface area is easily obtained. Specifically, when the reaction pH is set to 11.0 or less, a composite metal compound having a low BET specific surface area is easily obtained. In addition, when the oxidation state in the reaction tank is increased, a composite metal oxide having many voids is easily obtained. On the other hand, when the oxidation state is decreased, a dense metal oxide is easily obtained.

After the above reaction, the obtained reaction precipitate is washed with water and then dried to isolate a nickel cobalt manganese M hydroxide as a composite metal compound containing nickel, cobalt, manganese, and M. In addition, the reaction precipitate obtained may be washed with a weak acid water or an alkaline solution containing sodium hydroxide or potassium hydroxide, as necessary. In the above example, the nickel cobalt manganese M hydroxide is manufactured, but a nickel cobalt manganese M composite oxide may be prepared. In a case of preparing the nickel cobalt manganese M composite oxide, for example, a step of bringing the coprecipitate slurry into contact with an oxidizing agent or a step of performing a heat treatment on the nickel cobalt manganese M hydroxide may be performed.

Spraying and Mixing Step

In the spraying and mixing step, the composite metal compound powder containing nickel, cobalt, manganese, and M obtained in the above step is heated, an alkaline solution in which a tungsten compound is dissolved is sprayed onto the composite metal compound powder, and mixing is performed thereon, whereby the mixed powder is manufactured. Thereafter, the mixed powder is cooled.

In the spraying and mixing step, the tungsten compound is dissolved in the alkaline solution. The dissolution method is not particularly limited, and for example, using a reaction tank equipped with a stirring device, the tungsten compound may be added and dissolved while stirring the solution. From the viewpoint of suppressing the generation of foreign matter of tungsten, it is preferable that the tungsten compound be completely dissolved and uniformly dispersed in the alkaline solution.

The concentration of the tungsten compound in the alkaline solution is preferably 0.5 to 15 mass %, and more preferably 2.0 to 6.0 mass % with respect to the total mass of the alkaline solution. When the concentration of the tungsten compound is 15 mass % or more, there is a possibility that the undissolved residue of the tungsten compound may be generated. When the concentration of the tungsten compound is 15 mass % or less, the tungsten compound can be completely dissolved and uniformly dispersed in the alkaline solution.

Next, the composite metal compound powder containing nickel, cobalt, manganese and M obtained in the above step is heated, and an alkaline solution in which a tungsten compound is dissolved is sprayed onto the composite metal compound powder, and the composite metal compound powder containing nickel, cobalt, manganese and M and the tungsten compound are mixed together, whereby a mixed powder is manufactured. That is, while heating and stirring the composite metal compound powder containing nickel, cobalt, manganese, and M obtained in the above step, the alkaline solution in which the tungsten compound is dissolved is sprayed onto the composite metal compound powder, and the composite metal compound powder containing nickel, cobalt, manganese and M and the tungsten compound are mixed together, whereby the mixed powder is manufactured.

It is preferable that the composite metal compound powder be heated to a temperature or higher, at which the solvent of the alkaline solution evaporates. Specifically, the temperature at which the composite metal compound powder is heated is appropriately set in accordance with the boiling point of the solvent of the alkaline solution contained in the alkaline solution and the spraying conditions of the alkaline solution.

More specifically, the lower limit value of the temperature of the composite metal compound powder is preferably 100° C. or higher, and more preferably 105° C. or higher. The upper limit of the temperature of the composite metal compound powder is not particularly limited, and examples thereof include 150° C. or lower, 130° C. or lower, and 120° C. or less.

The upper limit and the lower limit can be randomly combined. For example, the temperature of the composite metal compound powder is preferably 100° C. or higher and 150° C. or lower, and more preferably 105° C. or higher and 120° C. or lower.

In the spraying and mixing step, the alkaline solution in which the tungsten compound is dissolved is sprayed onto the heated composite metal compound powder, and the composite metal compound and the tungsten compound are mixed together. The supply volume (L/min) during spraying of the alkaline solution, the discharge pressure (MPa), the nozzle diameter of the nozzles through which the alkaline solution is discharged, and the like are appropriately set according to the specifications of a heating and spraying apparatus used.

As an example, it is preferable to perform spraying and mixing with a supply amount of 1.0 to 3.0 L/h during spraying of the alkaline solution, a discharge pressure of 0.05 MPa to 1.0 MPa, and a nozzle diameter of 30 to 200 μm for 10 minutes to 600 minutes.

In addition, it is preferable that the temperature of the alkaline solution in the spraying step be 20° C. to 90° C.

The tungsten compound used in the spraying and mixing step is not particularly limited as long as it is soluble in the alkaline solution, and tungsten oxide, ammonium tungstate, sodium tungstate, and lithium tungstate can be used. In the present embodiment, among these, tungsten oxide is used.

In the spraying and mixing step, the tungsten compound is dissolved in the alkaline solution to be used. As an alkaline solute used in the alkaline solution, ammonia and lithium hydroxide can be used. In the present embodiment, it is preferable to use lithium hydroxide. The solvent used for the alkaline solution may be a liquid in which the solute dissolves, and water may be adopted.

After performing the spraying and mixing under the above conditions, the mixed powder is cooled to about room temperature (for example, 25° C.).

By the manufacturing method having the spraying and mixing step, the positive electrode active material for lithium secondary batteries in which the lithium-containing tungsten oxide is present at least in the interparticle spaces of the primary particles can be manufactured.

[Step of Manufacturing Lithium Composite Metal Compound]

The mixed powder of the composite metal compound and the tungsten compound (hereinafter, referred to as "mixed powder") is mixed with a lithium salt. As the lithium salt, any one or two or more of lithium carbonate, lithium nitrate, lithium acetate, lithium hydroxide, lithium hydroxide hydrate, and lithium oxide can be used.

The mixed powder may be suitably classified. The lithium salt and the mixed powder mentioned above are used in consideration of the composition ratio of the final object. For example, in a case of using a nickel cobalt manganese M composite hydroxide, the amounts of the lithium salt and the mixed powder are determined to be proportions corresponding to the composition ratio of $Li[Li_x(Ni_{(1-y-z-w)}Co_yMn_zM_w)_{1-x}]$.

Since it is necessary to determine the amount of the lithium salt in consideration of the generation of the lithium-containing tungsten oxide, the lithium salt and the mixed powder may be mixed in proportions such that the molar ratio (Li/Me) of lithium in the lithium salt to the metal element (Me) in the mixed powder containing nickel other than Li exceeds 1.

By calcining a mixture of the lithium salt and the mixed powder, the positive electrode active material for lithium secondary batteries in which the lithium-containing tungsten oxide is present at least in the interparticle spaces of the primary particles of the lithium composite metal compound can be obtained. Dry air, oxygen atmosphere, inert atmosphere, and the like are used for calcining depending on the desired composition, and a plurality of heating steps are performed as necessary.

The calcining temperature of the mixed powder and the lithium salt such as lithium hydroxide or lithium carbonate is not particularly limited, but is preferably 600° C. or higher and 1100° C. or lower, more preferably 750° C. or higher and 1050° C. or lower, and even more preferably 800° C. or higher and 1025° C. or lower. By causing the calcining temperature to be 600° C. or higher, the charge capacity can be increased. By causing the calcining temperature to be 1100° C. or lower, volatilization of Li can be prevented, and a lithium composite oxide having a target composition can be obtained.

The calcining time is preferably 3 hours to 50 hours. When the calcining time exceeds 50 hours, the battery performance tends to actually deteriorate due to volatilization of Li. That is, when the calcining time is 50 hours or shorter, volatilization of Li can be prevented. When the calcining time is shorter than 3 hours, the crystal growth is poor and the battery performance tends to deteriorate. That is, when the calcining time is 3 hours or longer, the crystal growth is good and the battery performance is enhanced. It is also effective to perform pre-calcining before the above-mentioned calcining. It is preferable to perform the pre-calcining at a temperature in a range of 300° C. to 850° C. for 1 to 10 hours. The crystallite size can be controlled to the desired range by appropriately adjusting the calcining atmosphere, calcining temperature, and calcining time. It is preferable to control the crystallite size by adjusting the calcining atmosphere and the calcining temperature, and as an example, by causing the calcining temperature to be the lower limit or higher, a lithium composite metal compound having ordered crystals is easily obtained, and the crystallite size can be controlled to the desired range.

It is preferable that the time until the calcining temperature is reached after the start of temperature increase be 0.5 hours or longer and 20 hours or shorter. When the time from the start of temperature increase until the calcining temperature is reached is in this range, a more uniform lithium composite metal compound can be obtained. In addition, it is preferable that the time until the temperature retention is ended after the calcining temperature is reached be 0.5 hours or longer and 20 hours or shorter. When the time until the temperature retention is ended after the calcining temperature is reached is in this range, the crystal growth proceeds more favorably and the battery performance can be further improved.

The lithium composite metal compound obtained by the calcining is suitably classified after pulverization and is regarded as a positive electrode active material applicable to lithium secondary batteries.

<Lithium Secondary Battery>

Next, a positive electrode using the positive electrode active material for lithium secondary batteries of the present invention as a positive electrode active material of a lithium secondary battery, and a lithium secondary battery having the positive electrode will be described while describing the configuration of a lithium secondary battery.

An example of the lithium secondary battery of the present embodiment includes a positive electrode, a negative electrode, a separator interposed between the positive electrode and the negative electrode, and an electrolytic solution disposed between the positive electrode and the negative electrode.

Figure 1B:
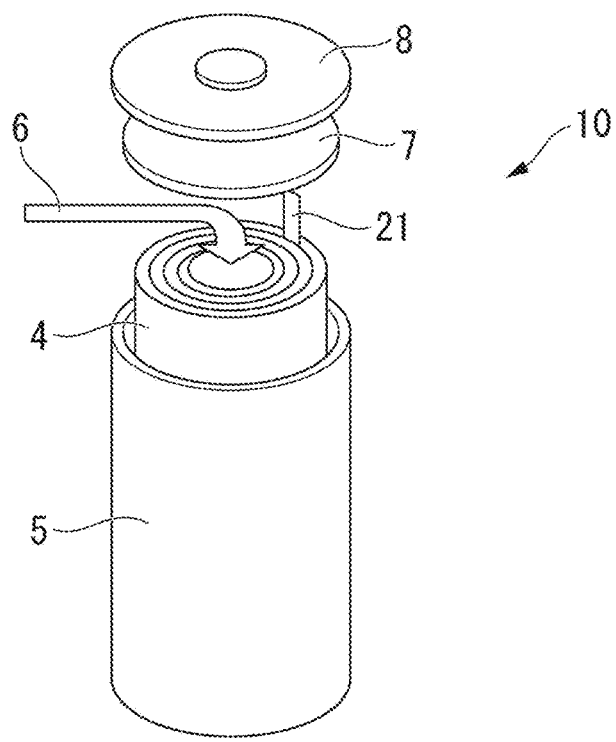
FIG. 1B is a schematic configuration view illustrating an example of the lithium-ion secondary battery.

FIGS. 1A and 1B are schematic views illustrating an example of the lithium secondary battery of the present embodiment. A cylindrical lithium secondary battery 10 of the present embodiment is manufactured as follows.

First, as illustrated in FIG. 1A, a pair of separators 1 having a strip shape, a strip-shaped positive electrode 2 having a positive electrode lead 21 at one end, and a strip-like negative electrode 3 having a negative electrode lead 31 at one end are stacked in order of the separator 1, the positive electrode 2, the separator 1, and the negative electrode 3 and are wound to form an electrode group 4.

Next, as shown in FIG. 1B, the electrode group 4 and an insulator (not illustrated) are accommodated in a battery can 5, the can bottom is then sealed, the electrode group 4 is impregnated with an electrolytic solution 6, and an electrolyte is disposed between the positive electrode 2 and the negative electrode 3. Furthermore, the upper portion of the battery can 5 is sealed with a top insulator 7 and a sealing body 8, whereby the lithium secondary battery 10 can be manufactured.

The shape of the electrode group 4 is, for example, a columnar shape such that the cross-sectional shape when the electrode group 4 is cut in a direction perpendicular to the winding axis is a circle, an ellipse, a rectangle, or a rectangle with rounded corners.

In addition, as a shape of the lithium secondary battery having the electrode group 4, a shape defined by IEC60086, which is a standard for a battery defined by the International Electrotechnical Commission (IEC), or by JIS C 8500 can be adopted. For example, shapes such as a cylindrical shape and a square shape can be adopted.

Furthermore, the lithium secondary battery is not limited to the wound type configuration, and may have a stacked type configuration in which a stacked structure of a positive electrode, a separator, a negative electrode, and a separator is repeatedly stacked. The stacked type lithium secondary battery can be exemplified by a so-called coin type battery, a button-type battery, and a paper type (or sheet type) battery.

Hereinafter, each configuration will be described in order.

(Positive Electrode)

The positive electrode of the present embodiment can be manufactured by first adjusting a positive electrode mixture containing a positive electrode active material, a conductive material, and a binder, and causing a positive electrode current collector to support the positive electrode mixture.

(Conductive Material)

A carbon material can be used as the conductive material of the positive electrode of the present embodiment. As the carbon material, graphite powder, carbon black (for example, acetylene black), a fibrous carbon material, and the like, can be used. Since carbon black is fine particles and has a large surface area, the addition of a small amount of carbon black to the positive electrode mixture increases the conductivity inside the positive electrode and thus improves the charge and discharge efficiency and output characteristics. However, when too much carbon black is added, both the binding force between the positive electrode mixture and the positive electrode current collector and the binding force inside the positive electrode mixture by the binder decrease, which causes an increase in internal resistance.

The proportion of the conductive material in the positive electrode mixture is preferably 5 parts by mass or more and 20 parts by mass or less with respect to 100 parts by mass of the positive electrode active material. In a case of using a fibrous carbon material such as graphitized carbon fiber or carbon nanotube as the conductive material, it is possible to lower this ratio.

(Binder)

A thermoplastic resin can be used as the binder included in the positive electrode of the present embodiment.

As the thermoplastic resin, fluorine resins such as polyvinylidene fluoride (hereinafter, sometimes referred to as PVdF), polytetrafluoroethylene (hereinafter, sometimes referred to as PTFE), tetrafluoroethylene-hexafluoropropylene-vinylidene fluoride copolymers, hexafluoropropylene-vinylidene fluoride copolymers, and tetrafluoroethylene-perfluorovinyl ether copolymers; and polyolefin resins such as polyethylene and polypropylene can be adopted.

These thermoplastic resins may be used as a mixture of two or more. By using a fluorine resin and a polyolefin resin as the binder and setting the ratio of the fluorine resin to the total mass of the positive electrode mixture to 1 mass % or more and 10 mass % or less and the ratio of the fluorine resin to 0.1 mass % or more and 2 mass % or less, a positive electrode mixture having high adhesion to the current collector and high bonding strength in the positive electrode mixture can be obtained.

(Positive Electrode Current Collector)

As the positive electrode current collector included in the positive electrode of the present embodiment, a strip-shaped member formed of a metal material such as Al, Ni, or stainless steel as the forming material can be used. Among these, from the viewpoint of ease of processing and low cost, it is preferable to use Al as the forming material and process Al into a thin film.

As a method of causing the positive electrode current collector to support the positive electrode mixture, a method of press-forming the positive electrode mixture on the positive electrode current collector can be adopted. In addition, the positive electrode mixture may be held by the positive electrode current collector by forming the positive electrode mixture into a paste using an organic solvent, applying the paste of the positive electrode mixture on at least one side of the positive electrode current collector, drying the paste, and pressing the paste to be fixed.

In a case of forming the positive electrode mixture into a paste, as the organic solvent which can be used, amine solvents such as N,N-dimethylaminopropylamine and diethylenetriamine; ether solvents such as tetrahydrofuran; ketone solvents such as methyl ethyl ketone; ester solvents such as methyl acetate; and amide solvents such as dimethylacetamide and N-methyl-2-pyrrolidone (hereinafter, sometimes referred to as NMP) can be adopted.

Examples of a method of applying the paste of the positive electrode mixture to the positive electrode current collector include a slit die coating method, a screen coating method, a curtain coating method, a knife coating method, a gravure coating method, and an electrostatic spraying method. The positive electrode can be manufactured by the method mentioned above.

(Negative Electrode)

The negative electrode included in the lithium secondary battery of the present embodiment may be capable of being doped with or dedoped from lithium ions at a potential lower than that of the positive electrode, and an electrode in which a negative electrode mixture containing a negative electrode active material is held by a negative electrode current collector, and an electrode formed of a negative electrode active material alone can be adopted.

(Negative Electrode Active Material)

As the negative electrode active material included in the negative electrode, materials can be doped with or dedoped from lithium ions at a potential lower than that of the positive electrode, such as carbon materials, chalcogen compounds (oxides, sulfides, and the like), nitrides, metals, and alloys can be adopted.

As the carbon materials that can be used as the negative electrode active material, graphite such as natural graphite and artificial graphite, cokes, carbon black, pyrolytic carbons, carbon fibers, and an organic polymer compound baked body can be adopted.

As the oxides that can be used as the negative electrode active material, oxides of silicon expressed by the formula $SiO_x$ (where, x is a positive real number) such as $SiO_2$ and SiO; oxides of titanium expressed by the formula $TiO_x$ (where x is a positive real number) such as $TiO_2$ and TiO; oxides of vanadium expressed by the formula $VO_x$ (where x is a positive real number) such as $V_2O_5$ and $VO_2$; oxides of iron expressed by the formula $FeO_x$ (where x is a positive real number) such as $Fe_3O_4$, $Fe_2O_3$, and FeO; oxides of tin expressed by the formula $SnO_x$ (where x is a positive real number) such as $SnO_2$ and SnO; oxides of tungsten expressed by a general formula $WO_x$ (where, x is a positive real number) such as $WO_3$ and $WO_2$; complex metal oxides containing lithium and titanium or vanadium such as $Li_4Ti_5O_{12}$ and $LiVO_2$ can be adopted.

As the sulfides that can be used as the negative electrode active material, sulfides of titanium expressed by the formula $TiS_x$ (where, x is a positive real number) such as $Ti_2S_3$, TiS$_2$, and TiS; sulfides of vanadium expressed by the formula VS$_x$ (where x is a positive real number) such V$_3$S$_4$, VS$_2$, and VS; sulfides of iron expressed by the formula FeS$_x$ (where x is a positive real number) such as Fe$_3$S$_4$, FeS$_2$, and FeS; sulfides of molybdenum expressed by the formula MoS$_x$ (where x is a positive real number) such as Mo$_2$S$_3$ and MoS$_2$; sulfides of tin expressed by the formula SnS$_x$ (where x is a positive real number) such as SnS$_2$ and SnS; sulfides of tungsten expressed by WS$_x$ (where x is a positive real number) such as WS$_2$; sulfides of antimony expressed by the formula SbS$_x$ (where x is a positive real number) such as Sb$_2$S$_3$; sulfides of selenium expressed by the formula SeS$_x$ (where x is a positive real number) such as Se$_5$S$_3$, SeS$_2$, and SeS can be adopted.

As the nitrides that can be used as the negative electrode active material, lithium-containing nitrides such as Li$_3$N and Li$_{3-x}$A$_x$N (where A is either one or both of Ni and Co, and $0<x<3$ is satisfied) can be adopted.

These carbon materials, oxides, sulfides, and nitrides may be used singly or in combination of two or more. In addition, these carbon materials, oxides, sulfides, and nitrides may be either crystalline or amorphous.

Moreover, as the metals that can be used as the negative electrode active material, lithium metal, silicon metal, tin metal, and the like can be adopted.

As the alloys that can be used as the negative electrode active material, lithium alloys such as Li—Al, Li—Ni, Li—Si, Li—Sn, and Li—Sn—Ni; silicon alloys such as Si—Zn; tin alloys such as Sn—Mn, Sn—Co, Sn—Ni, Sn—Cu, and Sn—La; alloys such as Cu$_2$Sb and La$_3$Ni$_2$Sn$_7$ can be adopted.

These metals and alloys are mainly used alone as an electrode after being processed into, for example, a foil shape.

Among the above-mentioned negative electrode active materials, the carbon material mainly including graphite such as natural graphite and artificial graphite is preferably used because the potential of the negative electrode hardly changes from the uncharged state to the fully charged state during charging (the potential flatness is good), the average discharge potential is low, and the capacity retention ratio during repeated charging and discharging is high (the cycle characteristics are good). The shape of the carbon material may be, for example, a flaky shape such as natural graphite, a spherical shape such as mesocarbon microbeads, a fibrous shape such as graphitized carbon fiber, or an aggregate of fine powder.

The negative electrode mixture described above may contain a binder as necessary. As the binder, a thermoplastic resin can be adopted, and specifically, PVdF, thermoplastic polyimide, carboxymethylcellulose, polyethylene, and polypropylene can be adopted.

(Negative Current Collector)

As the negative electrode collector included in the negative electrode, a strip-shaped member formed of a metal material, such as Cu, Ni, and stainless steel, as the forming material can be adopted. Among these, it is preferable to use Cu as the forming material and process Cu into a thin film because Cu is less likely to form an alloy with lithium and can be easily processed.

As a method of causing the negative electrode current collector to support the negative electrode mixture, similarly to the case of the positive electrode, a method using press-forming, or a method of forming the negative electrode mixture into a paste using a solvent or the like, applying the paste onto the negative electrode current collector, drying the paste, and pressing the paste to be compressed can be adopted.

(Separator)

As the separator included in the lithium secondary battery of the present embodiment, for example, a material having a form such as a porous film, non-woven fabric, or woven fabric made of a material such as a polyolefin resin such as polyethylene and polypropylene, a fluorine resin, and a nitrogen-containing aromatic polymer. In addition, two or more of these materials may be used to form the separator, or these materials may be stacked to form the separator.

In the present embodiment, the air resistance of the separator according to the Gurley method defined by JIS P 8117 is preferably 50 sec/100 cc or more and 300 sec/100 cc or less, and more preferably 50 sec/100 cc or more and 200 sec/100 cc or less in order for the electrolyte to favorably permeate therethrough during battery use (during charging and discharging).

In addition, the porosity of the separator is preferably 30 vol % or more and 80 vol % or less, and more preferably 40 vol % or more and 70 vol % or less with respect to the volume of the separator. The separator may be a laminate of separators having different porosity.

(Electrolytic Solution) The electrolytic solution included in the lithium secondary battery of the present embodiment contains an electrolyte and an organic solvent.

As the electrolyte contained in the electrolytic solution, lithium salts such as LiClO$_4$, LiPF$_6$, LiAsF$_6$, LiSbF$_6$, LiBF$_4$, LiCF$_3$SO$_3$, LiN(SO$_2$CF$_3$)$_2$, LiN(SO$_2$C$_2$F$_5$)$_2$, LiN(SO$_2$CF$_3$)(COCF$_3$), Li(C$_4$F$_9$SO$_3$), LiC(SO$_2$CF$_3$)$_3$, Li$_2$B$_{10}$Cl$_{10}$, LiBOB (here, BOB refers to bis(oxalato)borate), LiFSI (here, FSI refers to bis(fluorosulfonyl)imide), lower aliphatic carboxylic acid lithium salts, and LiAlCl$_4$ can be adopted, and a mixture of two or more of these may be used. Among these, as the electrolyte, it is preferable to use at least one selected from the group consisting of LiPF$_6$, LiAsF$_6$, LiSbF$_6$, LiBF$_4$, LiCF$_3$SO$_3$, LiN(SO$_2$CF$_3$)$_2$, and LiC(SO$_2$CF$_3$)$_3$, which contain fluorine.

As the organic solvent included in the electrolytic solution, for example, carbonates such as propylene carbonate, ethylene carbonate, dimethyl carbonate, diethyl carbonate, ethyl methyl carbonate, 4-trifluoromethyl-1,3-dioxolan-2-one, and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyltetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propanesultone, or those obtained by introducing a fluoro group into these organic solvents (those in which one or more of the hydrogen atoms of the organic solvent are substituted with a fluorine atom) can be used.

As the organic solvent, it is preferable to use a mixture of two or more thereof. Among these, a mixed solvent containing a carbonate is preferable, and a mixed solvent of a cyclic carbonate and a non-cyclic carbonate and a mixed solvent of a cyclic carbonate and an ether are more preferable. As the mixed solvent of a cyclic carbonate and a non-cyclic carbonate, a mixed solvent containing ethylene carbonate, dimethyl carbonate, and ethyl methyl carbonate is preferable. An electrolytic solution using such a mixed solvent has many features such as a wide operating temperature range, being less likely to deteriorate even when charged and discharged at a high current rate, being less likely to deteriorate even during a long-term use, and being non-degradable even in a case where a graphite material such as natural graphite or artificial graphite is used as the negative electrode active material.

Furthermore, as the electrolytic solution, it is preferable to use an electrolytic solution containing a lithium salt containing fluorine such as $LiPF_6$ and an organic solvent having a fluorine substituent in order to enhance the safety of the obtained lithium secondary battery. A mixed solvent containing ethers having a fluorine substituent, such as pentafluoropropyl methyl ether and 2,2,3,3-tetrafluoropropyl difluoromethyl ether and dimethyl carbonate is even more preferable because the capacity retention ratio is high even when charging or discharging is performed at a high current rate.

A solid electrolyte may be used instead of the electrolytic solution. As the solid electrolyte, for example, an organic polymer electrolyte such as a polyethylene oxide-based polymer compound, or a polymer compound containing at least one or more of a polyorganosiloxane chain or a polyoxyalkylene chain can be used. A so-called gel type in which a non-aqueous electrolyte is held in a polymer compound can also be used. Inorganic solid electrolytes containing sulfides such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, $Li_2S$—$SiS_2$—$Li_2SO_4$, and $Li_2S$—$GeS_2$—$P_2S_5$ can be adopted, and a mixture or two or more thereof may be used. By using these solid electrolytes, the safety of the lithium secondary battery may be further enhanced.

In addition, in a case of using a solid electrolyte in the lithium secondary battery of the present embodiment, there may be cases where the solid electrolyte plays a role of the separator, and in such a case, the separator may not be required.

Since the positive electrode active material having the above-described configuration uses the lithium composite metal compound of the present embodiment described above, the life of the lithium secondary battery using the positive electrode active material can be extended.

Moreover, since the positive electrode having the above-described configuration has the positive electrode active material for lithium secondary batteries of the present embodiment described above, the life of the lithium secondary battery can be extended.

Furthermore, since the lithium secondary battery having the above-described configuration has the positive electrode described above, a lithium secondary battery having a longer life than in the related art can be achieved.

EXAMPLES

Next, the present invention will be described in more detail with reference to examples.

In the present examples, evaluation of the positive electrode active material for lithium secondary batteries was performed as follows.

[Observation of Presence of Lithium-Containing Tungsten Oxide]

The point where the lithium-containing tungsten oxide was present was confirmed by the following method. The positive electrode active material for lithium secondary batteries was processed by a focused ion beam processing apparatus (FB-2200 manufactured by Hitachi High-Technologies Corporation) to allow the cross section of the secondary particles to be observed with a transmission electron microscope (TEM). Thereafter, the cross section of the secondary particles was observed by a TEM (JEM-2100F manufactured by JEOL Ltd.), and elemental analysis was performed on a plurality of points on the surface of the secondary particles and in the interparticle spaces of the primary particles present in the secondary particles using an energy dispersive X-ray analyzer (EDX, Centurio manufactured by JEOL Ltd.). The place where tungsten was detected by EDX was regarded as the point where the lithium-containing tungsten oxide was present.

[Measurement of BET Specific Surface Area]

After 1 g of a powder of the positive electrode active material for lithium secondary batteries was dried in a nitrogen atmosphere at 105° C. for 30 minutes, the powder was measured using a BET specific surface area meter device (Macsorb (registered trademark) manufactured by MOUNTECH Co., Ltd.).

[Measurement of Average Particle Diameter]

For measurement of the average particle diameter, using a laser diffraction particle size distribution analyzer (LA-950 manufactured by HORIBA, Ltd.), 0.1 g of the power of the positive electrode active material for lithium secondary batteries or a powder of the composite metal compound was poured into 50 ml of 0.2 mass % sodium hexametaphosphate aqueous solution, whereby a dispersion liquid in which the powder was dispersed was obtained. The particle size distribution of the obtained dispersion liquid was measured to obtain a volume-based cumulative particle size distribution curve. In the obtained cumulative particle size distribution curve, the value of the particle diameter ($D_{50}$) viewed from the fine particle side at a 50% cumulative point was taken as the average particle diameter of the positive electrode active material for lithium secondary batteries.

[Measurement of Crystallite Size]

Powder X-ray diffraction measurement of the lithium composite metal oxide was performed using an X-ray diffractometer (X'Prt PRO manufactured by Malvern Panalytical Ltd). The obtained positive electrode active material for lithium secondary batteries was provided in a dedicated substrate, and measurement was performed using a Cu-Kα radiation source at a diffraction angle in a range of $2\theta=10°$ to 90° to obtain a powder X-ray diffraction pattern. Using powder X-ray diffraction pattern comprehensive analysis software JADE 5, the half-width of the peak corresponding to the peak A' and the half-width of the peak corresponding to the peak B' were obtained from the powder X-ray diffraction pattern, and the crystallite diameter was calculated by the Scherrer equation.

Peak A': $2\theta=18.7\pm1°$
Peak B': $2\theta=44.6\pm1°$

[Pore Distribution Measurement of Positive Electrode Active Material for Lithium Secondary Batteries by Mercury Intrusion Method]

As a pretreatment, the positive electrode active material for lithium secondary batteries was isothermally dried at 120° C. for 4 hours. Pore distribution measurement was performed using a mercury porosimeter (Autopore III9420 manufactured by Micromeritics Instrument Corporation) under the following measurement conditions. The surface tension of mercury was set to 480 dynes/cm, and the contact angle between mercury and the sample was set to 140°.

Measurement Conditions
Measurement temperature: 25° C.
Measurement pressure: 1.07 psia to 59256.3 psia

[Compositional Analysis of Lithium-Containing Tungsten Oxide]

For compositional analysis of the lithium-containing tungsten oxide, XAFS analysis was used. The prepared positive electrode active material for lithium secondary batteries containing the lithium-containing tungsten oxide was introduced into a beamline (measuring device), and XAFS measurement and analysis of tungsten atoms were performed under the following conditions. In addition, XAFS measurement of a standard sample ($Li_2WO_4$, $Li_4WO_5$, or the like) of the lithium-containing tungsten oxide was also performed.

Measuring device: Inter-University Research Institute Corporation, High Energy Accelerator Research Organization BL-12C Measurement absorption edge: W-L3 absorption edge (10000 to 10500 eV) In the obtained XAFS spectrum, the baseline value was subtracted from the peak value, and by comparing the peak shapes of the positive electrode and the standard sample, the compositional analysis of the lithium-containing tungsten oxide was performed.

[Compositional Analysis of Positive Electrode Active Material for Lithium Secondary Batteries]

The compositional analysis of the positive electrode active material for lithium secondary batteries manufactured by the method described below was performed by using an inductively coupled plasma emission analyzer (SPS 3000, manufactured by SII Nano Technology Inc.) after dissolving the obtained powder of the lithium composite metal oxide in hydrochloric acid.

[Measurement of Particle Cracking after Cycles]

A lithium secondary battery was produced by the following method, and after a charge and discharge test, the presence or absence of particle cracking was observed. The presence or absence of particle cracking was confirmed by the following method. The lithium secondary battery after the charge and discharge test was disassembled in a glove box, and the positive electrode was taken out. The positive electrode was processed by an ion milling apparatus (IM4000 made by Hitachi High-Technologies Corporation) to obtain a cross section of the positive electrode active material contained in the mixture layer of the electrode. Next, using a scanning electron microscope (S-4800, manufactured by Hitachi High-Technologies Corporation), the cross section of the positive electrode active material obtained by the above processing was observed as a secondary electron image. The presence or absence of a cracked particle was confirmed at the junction between primary particles.

Based on the particle cross sections of Comparative Examples 1 to 5, a case where a larger number of particle cracks than in Comparative Example 1 in which the number of particle cracks was the smallest among Comparative Examples 1 to 5 was confirmed and was regarded as "particle cracking".

[Production of Lithium Secondary Battery]

Production of Positive Electrode for Lithium Secondary Batteries

A paste-like positive electrode mixture was prepared by adding the positive electrode active material for lithium secondary batteries obtained by the manufacturing method described later, a conductive material (acetylene black), and a binder (PVdF) to achieve a composition of positive electrode active material for lithium secondary batteries: conductive material:binder=92:5:3 (mass ratio) and performing kneading thereon. During the preparation of the positive electrode mixture, N-methyl-2-pyrrolidone was used as an organic solvent.

The obtained positive electrode mixture was applied to a 40 μm-thick Al foil serving as a current collector and vacuum dried at 150° C. for 8 hours to obtain a positive electrode for lithium secondary batteries. The electrode area of the positive electrode for lithium secondary batteries was set to 1.65 $cm^2$.

Production of Negative Electrode for Lithium Secondary Batteries

A paste-like negative electrode mixture was prepared by adding artificial graphite (MAGD manufactured by Hitachi Chemical Co., Ltd.) as a negative electrode active material, and CMC (manufactured by DKS Co. Ltd.) and SBR (made by NIPPON A&L INC.) as a binder to achieve a composition of negative electrode active material:CMC:SBR=98:1:1 (mass ratio), and performing kneading thereon. During the preparation of the negative electrode mixture, ion exchange water was used as a solvent.

The obtained negative electrode mixture was applied to a 12 μm-thick Cu foil serving as a current collector and vacuum dried at 100° C. for 8 hours to obtain a negative electrode for lithium secondary batteries. The electrode area of this negative electrode for lithium secondary batteries was set to 1.77 $cm^2$.

Production of Lithium Secondary Battery (Coin Type Full Cell)

The following operation was performed in a glove box under an argon atmosphere.

The positive electrode for lithium secondary batteries produced in "Production of Positive Electrode for Lithium Secondary Batteries" was placed on the lower lid of a part for coin type battery R2032 (manufactured by Hohsen Corp.) with the aluminum foil surface facing downward, and a laminated film separator (a heat-resistant porous layer (thickness 16 μm) laminated on a polyethylene porous film) was placed thereon. 300 μl of the electrolytic solution was injected thereinto. As the electrolytic solution, an electrolytic solution obtained by adding 1 vol % of vinylene carbonate (hereinafter, sometimes referred to as VC) to a mixed solution of ethylene carbonate (hereinafter, sometimes referred to as EC), dimethyl carbonate (hereinafter, sometimes referred to as DMC), and ethyl methyl carbonate (hereinafter, sometimes referred to as EMC) in a ratio of 16:10:74 (volume ratio), and dissolving $LiPF_6$ therein to achieve 1.3 mol/l (hereinafter, sometimes referred to as $LiPF_6$/EC+DMC+EMC) was used.

Next, the negative electrode for lithium secondary batteries produced in "Production of Negative Electrode for Lithium Secondary Batteries" was placed on the upper side of the laminated film separator, covered with the upper lid via a gasket, and caulked by a caulking machine, whereby a lithium secondary battery (coin type full cell R2032, hereinafter, sometimes referred to as "full cell") was produced.

Discharge Test

An initial charge and discharge test was conducted under the following conditions using the full cell produced in "Production of Lithium Secondary Battery (Coin Type Full Cell)".

<Charge and Discharge Test Conditions>

Test temperature: 25° C.

Charging maximum voltage 4.2 V, charging time 6 hours, charging current 0.2 CA, constant current constant voltage charging Discharging minimum voltage 2.7 V, discharging time 5 hours, discharging current 0.2 CA, constant current discharging <Cycle Test Conditions 1>

Using the above-mentioned coin type full cell, a cycle test for 500 cycles was conducted in a 60° C. environment under the following conditions.

Charging voltage 4.1 V, charging current 2.0 CA, constant current charging Discharging voltage 3.0 V, discharging current 2.0 CA, constant current discharging <Cycle Test Conditions 2>

Using the above-mentioned coin type full cell, a cycle test for 200 cycles was conducted in a 45° C. environment under the following conditions.

Charging voltage 4.35 V, charging current 0.5 CA, constant current constant voltage charging Discharging voltage 2.5 V, discharging current 1.0 CA, constant current discharging Comparative Example 1

<<Production of Positive Electrode Active Material 1 for Lithium Secondary Batteries>>

[Step of Manufacturing Composite Metal Compound]

After water was added to a reaction tank equipped with a stirrer and an overflow pipe, an aqueous solution of sodium hydroxide was added thereto, and the liquid was maintained at a pH of 12.6 (when measured at 40° C.) and a temperature of 30° C.

An aqueous solution of nickel sulfate, an aqueous solution of cobalt sulfate, and an aqueous solution of manganese sulfate were mixed so that the atomic ratio of nickel atoms, cobalt atoms, and manganese atoms became 55:21:24, whereby a mixed raw material solution was obtained.

Next, the mixed raw material solution and an aqueous solution of ammonium sulfate as a complexing agent were continuously added into the reaction tank whilst stirring, and an oxygen-containing gas obtained by mixing air in nitrogen gas was continuously flowed into the reaction tank to obtain an oxygen concentration of 8.3%.

An aqueous solution of sodium hydroxide was timely added dropwise so that the pH of the solution in the reaction tank became 12.6 (when measured at 40° C.) to obtain nickel cobalt manganese composite hydroxide particles, and the particles were washed with a sodium hydroxide solution, thereafter dehydrated by centrifugation to isolate, and dried at 105° C., whereby a nickel cobalt manganese composite metal compound 1 was obtained.

The nickel cobalt manganese composite metal compound 1 and lithium carbonate powder were weighed to achieve Li/(Ni+Co+Mn)=1.08 (molar ratio) and mixed. Thereafter, the mixture was subjected to primary calcining in an air atmosphere at 760° C. for 5 hours, and then subjected to secondary calcining in an air atmosphere at 850° C. for 10 hours, whereby a target positive electrode active material 1 for lithium secondary batteries was obtained. The BET specific surface area of the positive electrode active material 1 for lithium secondary batteries was 2.0 m$^2$/g, and $D_{50}$ thereof was 4.5 μm.

Furthermore, the crystallite size α corresponding to the peak A' was 830 Å, the crystallite size β corresponding to the peak B' was 517 Å, and α/β was 1.61.

In addition, the cumulative pore volume of pores having a pore diameter in a range of 10 nm to 200 nm was 0.035 mL/g, and the cumulative pore surface area thereof was 1.515 m$^2$/g.

<<Evaluation of Positive Electrode Active Material 1 for Lithium Secondary Batteries>>

Composition analysis of the obtained positive electrode active material 1 for lithium secondary batteries was performed, and when the composition was made to correspond to Composition Formula (I), x=0.04, y=0.21, z=0.24, and w=0 were obtained.

After conducting a cycle test on the obtained positive electrode active material 1 for lithium secondary batteries under the cycle test conditions 1, whether particle cracking in the positive electrode active material 1 for lithium secondary batteries occurred was observed. As a result, particle cracking in the particles was observed.

Comparative Example 2

<<Manufacturing of Positive Electrode Active Material 2 for Lithium Secondary Batteries>>

[Step of Manufacturing Composite Metal Compound]

After water was added to a reaction tank equipped with a stirrer and an overflow pipe, an aqueous solution of sodium hydroxide was added thereto, and the liquid was maintained at a pH of 13.0 (when measured at 40° C.) and a temperature of 30° C.

An aqueous solution of nickel sulfate, an aqueous solution of cobalt sulfate, and an aqueous solution of manganese sulfate were mixed so that the atomic ratio of nickel atoms, cobalt atoms, and manganese atoms became 55:21:24, whereby a mixed raw material solution was obtained.

Next, the mixed raw material solution and an aqueous solution of ammonium sulfate as a complexing agent were continuously added into the reaction tank whilst stirring, and nitrogen gas was continuously flowed into the reaction tank to obtain an oxygen concentration of 0%.

An aqueous solution of sodium hydroxide was appropriately added dropwise so that the pH of the solution in the reaction tank became 13.0 (when measured at 40° C.) to obtain nickel cobalt manganese composite hydroxide particles, and the particles were washed with a sodium hydroxide solution, thereafter dehydrated by centrifugation to isolate, and dried at 105° C., whereby a nickel cobalt manganese composite metal compound 2 was obtained.

The nickel cobalt manganese composite metal compound 2 and lithium carbonate powder were weighed to achieve Li/(Ni+Co+Mn)=1.06 (molar ratio) and mixed. Thereafter, the mixture was subjected to primary calcining in an air atmosphere at 760° C. for 5 hours, and then subjected to secondary calcining in an air atmosphere at 850° C. for 10 hours, whereby a target positive electrode active material 2 for lithium secondary batteries was obtained. The BET specific surface area of the positive electrode active material 2 for lithium secondary batteries was 0.7 m$^2$/g, and $D_{50}$ thereof was 6.9 μm.

Furthermore, the crystallite size α corresponding to the peak A' was 752 Å, the crystallite size β corresponding to the peak B' was 438 Å, and α/β was 1.72.

In addition, the cumulative pore volume of pores having a pore diameter in a range of 10 nm to 200 nm was 0 mL/g, and the cumulative pore surface area thereof was 0.005 m$^2$/g.

<<Evaluation of Positive Electrode Active Material 2 for Lithium Secondary Batteries>>

Composition analysis of the obtained positive electrode active material 2 for lithium secondary batteries was performed, and when the composition was made to correspond to Composition Formula (I), x=0.03 y=0.21, z=0.24, and w=0 were obtained.

After conducting a cycle test on the obtained positive electrode active material 2 for lithium secondary batteries under the cycle test conditions 1, whether particle cracking in the positive electrode active material 2 for lithium secondary batteries occurred was observed. As a result, particle cracking in the particles was observed.

Comparative Example 3

<<Manufacturing of Positive Electrode Active Material 3 for Lithium Secondary Batteries>>

Next, the nickel cobalt manganese composite metal compound 2 obtained in the same manner as in Comparative Example 2 and lithium carbonate powder were weighed to achieve Li/(Ni+Co+Mn)=1.06 (molar ratio) and mixed. Thereafter, the mixture was subjected to primary calcining in an air atmosphere at 760° C. for 5 hours, and the obtained primary backed powder and tungsten oxide powder were mixed to cause the atomic ratio of tungsten atoms to the sum of nickel atoms, cobalt atoms, and manganese to be 0.5 mol %, whereby a mixed powder 3 was obtained.

By subjecting the mixed powder 3 to secondary calcining at 850° C. for 10 hours, a target positive electrode active material 3 for lithium secondary batteries was obtained. The BET specific surface area of the positive electrode active material 3 for lithium secondary batteries was 0.7 m$^2$/g, and D$_{50}$ thereof was 6.4 µm. Furthermore, the crystallite size α corresponding to the peak A' was 725 Å, the crystallite size β corresponding to the peak B' was 425 Å, and α/β was 1.71.

In addition, the cumulative pore volume of pores having a pore diameter in a range of 10 nm to 200 nm was 0 mL/g, and the cumulative pore surface area thereof was 0.308 m$^2$/g.

<<Evaluation of Positive Electrode Active Material 3 for Lithium Secondary Batteries>>

When the obtained positive electrode active material 3 for lithium secondary batteries was observed with a transmission electron microscope, the lithium-containing tungsten oxide was not present in the interparticle spaces of the primary particles in the secondary particles and covered only the surface of the secondary particles.

Furthermore, composition analysis of the obtained positive electrode active material 3 for lithium secondary batteries was performed, and when the composition was made to correspond to Composition Formula (I), x=0.03, y=0.21, z=0.24, and w=0 were obtained.

Moreover, the tungsten content in the positive electrode active material 3 for lithium secondary batteries was 0.5 mol % with respect to the total molar amount of the transition metals.

After conducting a cycle test on the obtained positive electrode active material 3 for lithium secondary batteries under the cycle test conditions 1, whether particle cracking in the positive electrode active material 3 for lithium secondary batteries occurred was observed. As a result, particle cracking in the particles was observed.

Example 1

<<Manufacturing of Positive Electrode Active Material 4 for Lithium Secondary Batteries>>

Spraying and Mixing Step

The nickel cobalt manganese composite metal compound 1 obtained in the same manner as in Comparative Example 1 was heated to 105° C. and mixed, and simultaneously, an alkaline solution in which tungsten oxide was dissolved in an aqueous solution of lithium hydroxide was sprayed thereonto for 1 hour. The concentration of tungsten in the alkaline solution was adjusted to obtain an atomic ratio of tungsten atoms to the sum of nickel atoms, cobalt atoms, and manganese atoms of 0.5 mol %.

Thereafter, cooling was performed thereon, whereby a mixed powder 4 was obtained. The spraying conditions were as follows.

{Spraying Conditions}
Nozzle diameter: 45 µm
Discharge pressure: 0.6 MPaG
Flow rate: 1.9 L/h
Amount of powder of nickel cobalt manganese composite metal hydroxide: 4100 g
Amount of alkaline solution: 1850 g

[Step of Manufacturing Lithium Composite Metal Oxide 4]

The mixed powder 4 and lithium carbonate powder were weighed to achieve Li/(Ni+Co+Mn)=1.13 (molar ratio) and mixed. Thereafter, the mixture was subjected to primary calcining in an air atmosphere at 760° C. for 5 hours, and further subjected to secondary calcining in an air atmosphere at 850° C. for 10 hours, whereby a target positive electrode active material 4 for lithium secondary batteries was obtained. The BET specific surface area of the positive electrode active material 4 for lithium secondary batteries was 2.5 m$^2$/g, and D$_{50}$ thereof was 3.6 µm.

Furthermore, the crystallite size α corresponding to the peak A' was 746 Å, the crystallite size β corresponding to the peak B' was 469 Å, and α/β was 1.59.

In addition, the cumulative pore volume of pores having a pore diameter in a range of 10 nm to 200 nm was 0.055 mL/g, and the cumulative pore surface area thereof was 1.281 m$^2$/g.

<<Evaluation of Positive Electrode Active Material 4 for Lithium Secondary Batteries>>

When the obtained positive electrode active material 4 for lithium secondary batteries was observed with a transmission electron microscope, it could be confirmed that the lithium-containing tungsten oxide was present in the interparticle spaces of the primary particles in the secondary particles and on the surface of the secondary particles.

Furthermore, composition analysis of the obtained positive electrode active material 4 for lithium secondary batteries was performed, and when the composition was made to correspond to Composition Formula (I), x=0.06, y=0.21, z=0.24, and w=0 were obtained.

Moreover, the tungsten content in the positive electrode active material 4 for lithium secondary batteries was 0.5 mol % with respect to the total molar amount of the transition metals.

When the obtained positive electrode active material 4 for lithium secondary batteries was measured by XAFS, the main component of the lithium-containing tungsten oxide contained in the positive electrode active material for lithium secondary batteries was Li$_4$WO$_5$.

After conducting a cycle test under the cycle test conditions 1, whether particle cracking in the positive electrode active material 4 for lithium secondary batteries occurred was observed. As a result, it was confirmed that no particle cracking occurred, and there was a significant improvement compared to Comparative Examples 1, 2, and 3.

Comparative Example 4

<<Manufacturing of Positive Electrode Active Material 5 for Lithium Secondary Batteries>>

[Step of Manufacturing Composite Metal Compound]

After water was added to a reaction tank equipped with a stirrer and an overflow pipe, an aqueous solution of sodium hydroxide was added thereto, and the liquid was maintained at a pH of 11.7 (when measured at 40° C.) and a temperature of 50° C.

An aqueous solution of nickel sulfate, an aqueous solution of cobalt sulfate, and an aqueous solution of manganese sulfate were mixed so that the atomic ratio of nickel atoms, cobalt atoms, and manganese atoms became 32:33:36, whereby a mixed raw material solution was obtained.

Next, the mixed raw material solution and an aqueous solution of ammonium sulfate as a complexing agent were continuously added into the reaction tank whilst stirring, and an oxygen-containing gas obtained by mixing air in nitrogen gas was continuously flowed into the reaction tank to obtain an oxygen concentration of 3.3%. An aqueous solution of sodium hydroxide was appropriately added dropwise so that the pH of the solution in the reaction tank became 11.7 (when measured at 40° C.) to obtain nickel cobalt manganese composite hydroxide particles, and the particles were washed with a sodium hydroxide solution, thereafter dehydrated by centrifugation to isolate, and dried at 105° C., whereby a nickel cobalt manganese composite metal compound 5 was obtained.

The nickel cobalt manganese composite metal compound 5 and lithium carbonate powder were weighed to achieve Li/(Ni+Co+Mn)=1.13 (molar ratio) and mixed. Thereafter, the mixture was subjected to primary calcining in an air atmosphere at 760° C. for 5 hours, and then subjected to secondary calcining in an air atmosphere at 850° C. for 10 hours, whereby a target positive electrode active material 5 for lithium secondary batteries was obtained. The BET specific surface area of the positive electrode active material 5 for lithium secondary batteries was 2.4 m$^2$/g, and $D_{50}$ thereof was 4.0 μm.

Furthermore, the crystallite size α corresponding to the peak A' was 830 Å, the crystallite size β corresponding to the peak B' was 508 Å, and α/β was 1.63.

In addition, the cumulative pore volume of pores having a pore diameter in a range of 10 nm to 200 nm was 0.039 mL/g, and the cumulative pore surface area thereof was 0.822 m$^2$/g.

<<Evaluation of Positive Electrode Active Material 5 for Lithium Secondary Batteries>>

Composition analysis of the obtained positive electrode active material 5 for lithium secondary batteries was performed, and when the composition was made to correspond to Composition Formula (I), x=0.06, y=0.33, z=0.36, and w=0 were obtained.

After conducting a cycle test on the obtained positive electrode active material 5 for lithium secondary batteries under the cycle test conditions 1, whether particle cracking in the positive electrode active material 5 for lithium secondary batteries occurred was observed. As a result, particle cracking in the particles was observed.

Example 2

<<Manufacturing of Positive Electrode Active Material 6 for Lithium Secondary Batteries>>

Spraying and Mixing Step

The nickel cobalt manganese composite metal compound 5 obtained in the same manner as in Comparative Example 4 was heated to 105° C. and mixed, and simultaneously, an alkaline solution in which tungsten oxide was dissolved in an aqueous solution of lithium hydroxide was sprayed thereonto for 0.5 hours. At this time, the concentration of tungsten in the alkaline solution was adjusted to obtain an atomic ratio of tungsten atoms to the sum of nickel atoms, cobalt atoms, and manganese atoms of 0.5 mol %. Thereafter, cooling was performed thereon, whereby a mixed powder 6 was obtained. The spraying conditions were as follows.

{Spraying Conditions}
Nozzle diameter: 45 μm
Discharge pressure: 0.6 MPaG
Flow rate: 1.9 L/h
Amount of powder of nickel cobalt manganese composite metal hydroxide: 4100 g
Amount of alkaline solution: 950 g

[Step of Manufacturing Lithium Composite Metal Oxide]

The mixed powder 6 and lithium carbonate powder were weighed to achieve Li/(Ni+Co+Mn)=1.11 (molar ratio) and mixed. Thereafter, the mixture was subjected to primary calcining in an air atmosphere at 690° C. for 5 hours, and further subjected to secondary calcining in an air atmosphere at 950° C. for 6 hours, whereby a target positive electrode active material 6 for lithium secondary batteries was obtained. The BET specific surface area of the positive electrode active material 6 for lithium secondary batteries was 2.4 m$^2$/g, and $D_{50}$ thereof was 3.4 μm.

Furthermore, the crystallite size α corresponding to the peak A' was 797 Å, the crystallite size β corresponding to the peak B' was 467 Å, and α/β was 1.71.

In addition, the cumulative pore volume of pores having a pore diameter in a range of 10 nm to 200 nm was 0.037 mL/g, and the cumulative pore surface area thereof was 0.955 m$^2$/g.

<<Evaluation of Positive Electrode Active Material 6 for Lithium Secondary Batteries>>

When the obtained positive electrode active material 6 for lithium secondary batteries was observed with a transmission electron microscope, it could be confirmed that the lithium-containing tungsten oxide was present in the interparticle spaces of the primary particles in the secondary particles and on the surface of the secondary particles.

Furthermore, composition analysis of the obtained positive electrode active material 6 for lithium secondary batteries was performed, and when the composition was made to correspond to Composition Formula (I), x=0.05, y=0.33, z=0.35, and w=0 were obtained.

Moreover, the tungsten content in the positive electrode active material 2 for lithium secondary batteries was 0.5 mol % with respect to the total molar amount of the transition metals.

When the obtained positive electrode active material 6 for lithium secondary batteries was measured by XAFS, the main component of the lithium-containing tungsten oxide contained in the positive electrode active material for lithium secondary batteries was $Li_4WO_5$.

After conducting a cycle test under the cycle test conditions 1, whether particle cracking in the positive electrode active material 6 for lithium secondary batteries occurred was observed. As a result, it was confirmed that no particle cracking occurred, and there was a significant improvement compared to Comparative Example 4.

Comparative Example 5

<<Manufacturing of Positive Electrode Active Material 7 for Lithium Secondary Batteries>>

[Step of Manufacturing Composite Metal Compound]

After water was add to a reaction tank equipped with a stirrer and an overflow pipe, an aqueous solution of sodium hydroxide was added thereto, and the liquid was maintained at a pH of 12.1 (when measured at 40° C.) and a temperature of 60° C.

An aqueous solution of nickel sulfate, an aqueous solution of cobalt sulfate, and an aqueous solution of manganese sulfate were mixed so that the atomic ratio of nickel atoms, cobalt atoms, and manganese atoms became 87.5:9.5:2, whereby a mixed raw material solution was obtained.

Next, the mixed raw material solution and 10.8 mass % of an aqueous solution of aluminum sulfate and an aqueous solution of ammonium sulfate as a complexing agent were continuously added into the reaction tank whilst stirring, and an oxygen-containing gas obtained by mixing air in nitrogen gas was continuously flowed into the reaction tank to obtain an oxygen concentration of 5.0%. The flow rate of the aqueous solution of aluminum sulfate was adjusted so that the atomic ratio of nickel atoms, cobalt atoms, manganese atoms, aluminum atoms became 87.5:9.5:2:1. An aqueous solution of sodium hydroxide was appropriately added dropwise so that the pH of the solution in the reaction tank became 12.1 (when measured at 40° C.) to obtain nickel cobalt manganese aluminum composite hydroxide particles, and the particles were washed with a sodium hydroxide solution, thereafter dehydrated by centrifugation to isolate, and dried at 105° C., whereby a nickel cobalt manganese composite metal compound 7 was obtained.

[Step of Manufacturing Lithium Composite Metal Oxide]

The nickel cobalt manganese aluminum composite metal compound 7 and lithium carbonate powder were weighed to achieve Li/(Ni+Co+Mn+Al)=1.01 (molar ratio) and mixed. Thereafter, the mixture was subjected to primary calcining in an oxygen atmosphere at 770° C. for 5 hours, and then subjected to secondary calcining in an oxygen atmosphere at 770° C. for 5 hours, whereby a target positive electrode active material 7 for lithium secondary batteries was obtained. The BET specific surface area of the positive electrode active material 7 for lithium secondary batteries was 0.2 m$^2$/g, and D$_{50}$ thereof was 12.3 μm. Furthermore, the crystallite size α corresponding to the peak A' was 875 Å, the crystallite size β corresponding to the peak B' was 466 Å, and α/β was 1.88.

In addition, the cumulative pore volume of pores having a pore diameter in a range of 10 nm to 200 nm was 0 mL/g, and the cumulative pore surface area thereof was 0.281 m$^2$/g.

<<Evaluation of Positive Electrode Active Material 7 for Lithium Secondary Batteries>>

Composition analysis of the obtained positive electrode active material 7 for lithium secondary batteries was performed, and when the composition was made to correspond to Composition Formula (I), x=0.005, y=0.1, z=0.02, and w=0.01 were obtained.

After conducting a cycle test on the obtained positive electrode active material 7 for lithium secondary batteries under the cycle test conditions 2, whether particle cracking in the positive electrode active material 7 for lithium secondary batteries occurred was observed. As a result, particle cracking in the particles was observed.

Example 3

<<Manufacturing of Positive Electrode Active Material 8 for Lithium Secondary Batteries>>

Spraying and Mixing Step

The nickel cobalt manganese aluminum composite metal compound 7 obtained in the same manner as in Comparative Example 5 was heated to 105° C. and mixed, and simultaneously, an alkaline solution in which tungsten oxide was dissolved in an aqueous solution of lithium hydroxide was sprayed thereonto for 2.5 hours. At this time, the concentration of tungsten in the alkaline solution was adjusted to obtain an atomic ratio of tungsten atoms to the sum of nickel atoms, cobalt atoms, and manganese atoms of 0.5 mol %. Thereafter, cooling was performed thereon, whereby a mixed powder 8 was obtained. The spraying conditions were as follows.

{Spraying Conditions}
Nozzle diameter: 45 μm
Discharge pressure: 0.6 MPaG
Flow rate: 1.9 L/h
Amount of powder of nickel cobalt manganese composite metal hydroxide: 9000 g
Amount of alkaline solution: 4700 g

[Step of Manufacturing Lithium Composite Metal Oxide]

The mixed powder 8 and lithium carbonate powder were weighed to achieve Li/(Ni+Co+Mn+Al)=1.01 (molar ratio) and mixed. Thereafter, the mixture was subjected to primary calcining in an oxygen atmosphere at 770° C. for 5 hours, and further subjected to secondary calcining in an oxygen atmosphere at 770° C. for 5 hours, whereby a target positive electrode active material 8 for lithium secondary batteries was obtained. The BET specific surface area of the positive electrode active material 8 for lithium secondary batteries was 0.8 m$^2$/g, and D$_{50}$ thereof was 9.7 μm.

Furthermore, the crystallite size α corresponding to the peak A' was 601 Å, the crystallite size β corresponding to the peak B' was 394 Å, and α/β was 1.53.

In addition, the cumulative pore volume of pores having a pore diameter in a range of 10 nm to 200 nm was 0.019 mL/g, and the cumulative pore surface area thereof was 1.191 m$^2$/g.

<<Evaluation of Positive Electrode Active Material 8 for Lithium Secondary Batteries>>

When the obtained positive electrode active material 8 for lithium secondary batteries was observed with a transmission electron microscope, it could be confirmed that the lithium-containing tungsten oxide was present in the interparticle spaces of the primary particles, at primary particle boundaries, and on the surface of the secondary particles.

Furthermore, composition analysis of the obtained positive electrode active material 8 for lithium secondary batteries was performed, and when the composition was made to correspond to Composition Formula (I), x=0.005, y=0.1, z=0.02, and w=0.03 were obtained.

Moreover, the tungsten content in the positive electrode active material 8 for lithium secondary batteries was 0.5 mol % with respect to the total molar amount of the transition metals.

When the obtained positive electrode active material 8 for lithium secondary batteries was measured by XAFS, the main component of the lithium-containing tungsten oxide contained in the positive electrode active material for lithium secondary batteries was Li$_4$WO$_5$.

After conducting a cycle test under the cycle test conditions 2, whether particle cracking in the positive electrode active material 8 for lithium secondary batteries occurred was observed. As a result, it was confirmed that no particle cracking occurred, and there was a significant improvement compared to Comparative Example 5.

The results of Examples 1 to 3 and Comparative Examples 1 to 5 are summarized in Table 1 below.

Numerical values corresponding to Ni, Co, Mn, and Al of the positive electrode material in Table 1 are atomic ratios, and respectively correspond to (1−y−z−w), y, z, and w in Composition Formula (I). In Table 1, numerical values corresponding to W are the atomic ratio (mol %) of tungsten atoms in the alkaline solution to the sum of nickel atoms, cobalt atoms, manganese atoms, and M atoms in the spraying and mixing step. In Table 1, in "Li", a case where lithium was confirmed as the lithium-containing tungsten oxide was denoted by O, and a case where lithium was not confirmed as the lithium-containing tungsten oxide is denoted by X. In Table 1, in "Secondary particle surface", a case where lithium was confirmed as the lithium-containing tungsten oxide is denoted by O, and the case where lithium was not confirmed as the lithium-containing tungsten oxide is denoted by X. In Table 1, in "Interparticle spaces of primary particles", a case where the lithium-containing tungsten oxide was confirmed to be present in the interparticle spaces of the primary particles is denoted by O, and a case where the lithium-containing tungsten oxide was not confirmed to be present in the interparticle spaces of the primary particles is denoted by X. $L_{003}$ and $L_{104}$ in Table 1 respectively indicate the crystallite size α and the crystallite size β.

example to which the present invention was applied, it was confirmed that no particle cracking occurred. Contrary to this, in Comparative Example 1 to which the present invention was not applied, particle cracking was confirmed at points indicated by the arrows in FIG. 3.

INDUSTRIAL APPLICABILITY

According to the present invention, it is possible to provide a positive electrode active material for lithium secondary batteries in which particle cracking after cycles is significantly suppressed, and a positive electrode for lithium secondary batteries and a lithium secondary battery using the same.

REFERENCE SIGNS LIST

1: separator, 2: positive electrode, 3: negative electrode, 4: electrode group, 5: battery can, 6: electrolytic solution, 7: top insulator, 8: sealing body, 10: lithium secondary battery, 21: positive electrode lead, 31: negative electrode lead

The invention claimed is:

1. A positive electrode active material for lithium secondary batteries, comprising:

TABLE 1

| | Composition | | | | | | State of lithium-containing tungsten oxide | | |
|---|---|---|---|---|---|---|---|---|---|
| | Positive electrode material | | | | Lithium-containing tungsten oxide | | TEM observation | Presence point | |
| | | | | | | | | Secondary particle surfaces | Interparticle spaces of primary particles |
| Example | Ni | Co | Mn | Al | Li | W | | | |
| Comparative Example 1 | 0.55 | 0.21 | 0.24 | 0 | X | 0 | Absent | X | X |
| Comparative Example 2 | 0.55 | 0.21 | 0.24 | 0 | X | 0 | Absent | X | X |
| Comparative Example 3 | 0.55 | 0.21 | 0.24 | 0.1 | O | 0.5 | Covered | O | X |
| Example 1 | 0.55 | 0.21 | 0.24 | 0 | O | 0.5 | Covered | O | O |
| Comparative Example 4 | 0.32 | 0.33 | 0.36 | 0 | X | 0 | Absent | X | X |
| Example 2 | 0.32 | 0.33 | 0.36 | 0 | O | 0.5 | Covered | O | O |
| Comparative Example 5 | 0.86 | 0.1 | 0.02 | 0.03 | X | 0 | Absent | X | X |
| Example 3 | 0.86 | 0.1 | 0.02 | 0.03 | O | 0.5 | Covered | O | O |

| | Powder physical properties | | | | | | | |
|---|---|---|---|---|---|---|---|---|
| Example | D50 μm | BET m2/g | $L_{003}$ Å | $L_{104}$ Å | $L_{003}/L_{104}$ | Cumulative pore volume mL/g | Cumulative pore surface area m2/g | Particle cracking after cycles |
| Comparative Example 1 | 4.5 | 2.0 | 830 | 517 | 1.61 | 0.035 | 1.515 | Present |
| Comparative Example 2 | 6.9 | 0.7 | 752 | 438 | 1.72 | Absent | 0.005 | Present |
| Comparative Example 3 | 6.4 | 0.7 | 725 | 425 | 1.71 | Absent | 0.308 | Present |
| Example 1 | 3.6 | 2.5 | 746 | 469 | 1.59 | 0.055 | 1.281 | Absent |
| Comparative Example 4 | 4.0 | 2.4 | 830 | 508 | 1.63 | 0.039 | 0.822 | Present |
| Example 2 | 3.4 | 2.4 | 797 | 467 | 1.71 | 0.037 | 0.955 | Absent |
| Comparative Example 5 | 12.3 | 0.2 | 875 | 466 | 1.88 | Absent | 0.281 | Present |
| Example 3 | 9.7 | 0.8 | 601 | 394 | 1.53 | 0.019 | 1.191 | Absent |

Figure 2:
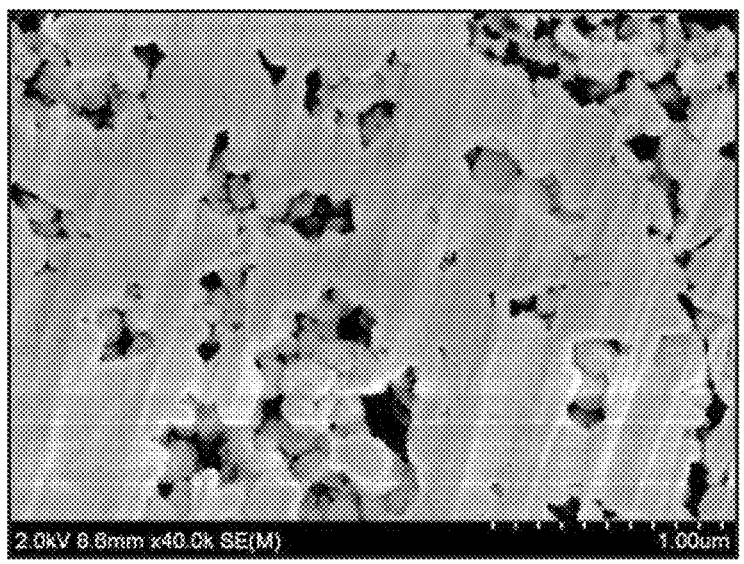
FIG. 2 is an SEM image of a cross section of a positive electrode active material for lithium secondary batteries of Example 1.
Figure 3:
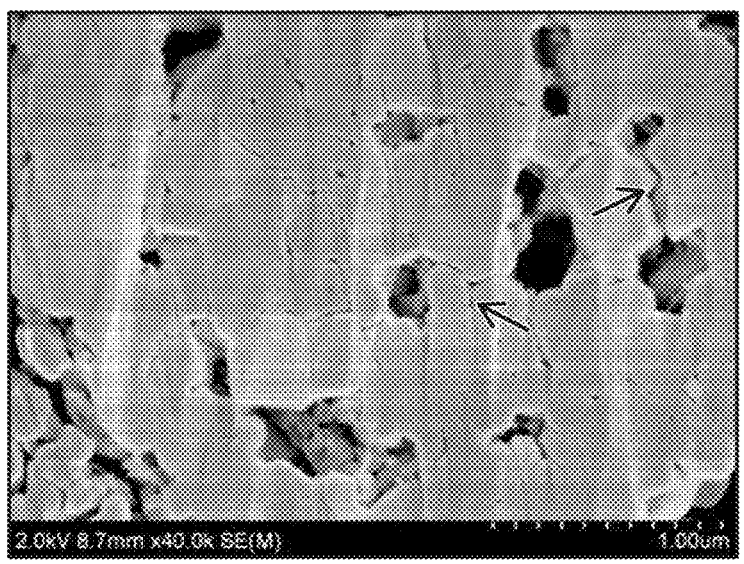
FIG. 3 is an SEM image of a cross section of a positive electrode active material for lithium secondary batteries of Comparative Example 1.

FIG. 2 shows an SEM photograph of the particle cross section of the positive electrode active material for lithium secondary batteries of Example 1. FIG. 3 shows an SEM photograph of the particle cross section of the positive electrode active material for lithium secondary batteries of Comparative Example 1. As shown in FIGS. 2 and 3, in the a lithium composite metal compound containing secondary particles that are aggregates of primary particles; and
a lithium-containing tungsten oxide,
wherein the lithium-containing tungsten oxide is present at least in interparticle spaces of the primary particles, and
in a pore distribution of the positive electrode active material for lithium secondary batteries measured by a mercury intrusion method, a pore surface area of pores having a pore diameter in a range of 10 nm or more to 200 nm or less is 0.4 m$^2$/g or more and 3.0 m$^2$/g or less.

2. The positive electrode active material for lithium secondary batteries according to claim 1,
wherein the lithium composite metal compound is expressed by Composition Formula (I)

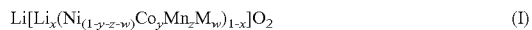

$$\text{Li}[\text{Li}_x(\text{Ni}_{(1-y-z-w)}\text{Co}_y\text{Mn}_z\text{M}_w)_{1-x}]\text{O}_2 \qquad (I)$$

(in Composition Formula (I), −0.1≤x≤0.2, 0<y≤0.5, 0<z≤0.8, 0≤w≤0.1, 1−y−z−w <1 and y+z+w<1 are satisfied, and M represents one or more metals selected from the group consisting of Fe, Cu, Ti, Mg, Al, W, B, Mo, Nb, Zn, Sn, Zr, Ga, and V).

3. The positive electrode active material for lithium secondary batteries according to claim 1,
wherein a crystallite size α of the lithium composite metal compound corresponding to a peak within a range of 2θ=18.7±1° in powder X-ray diffraction measurement using CuKα radiation is 500 to 850 Å.

4. The positive electrode active material for lithium secondary batteries according to claim 1,
wherein, in the pore distribution of the positive electrode active material for lithium secondary batteries measured by the mercury intrusion method, a pore volume of pores having a pore diameter in a range of 10 nm or more and 200 nm or less is 0.01 mL/g or more and 0.06 mL/g or less.

5. The positive electrode active material for lithium secondary batteries according to claim 1,
wherein the lithium-containing tungsten oxide is at least one of Li$_2$WO$_4$ and Li$_4$WO$_5$.

6. The positive electrode active material for lithium secondary batteries according to claim 1,
wherein the lithium-containing tungsten oxide is present at primary particle boundaries of the lithium composite metal compound.

7. A positive electrode for lithium secondary batteries, comprising:
the positive electrode active material for lithium secondary batteries according to claim 1.

8. A lithium secondary battery comprising:
the positive electrode for lithium secondary batteries according to claim 7.

9. The positive electrode active material for lithium secondary batteries according to claim 2,
wherein a crystallite size α of the lithium composite metal compound corresponding to a peak within a range of 2θ=18.7±1° in powder X-ray diffraction measurement using CuKα radiation is 500 to 850 Å.

10. The positive electrode active material for lithium secondary batteries according to claim 2,
wherein, in the pore distribution of the positive electrode active material for lithium secondary batteries measured by the mercury intrusion method, a pore volume of pores having a pore diameter in a range of 10 nm or more and 200 nm or less is 0.01 mL/g or more and 0.06 mL/g or less.

11. The positive electrode active material for lithium secondary batteries according to claim 2,
wherein the lithium-containing tungsten oxide is at least one of Li$_2$WO$_4$ and Li$_4$WO$_5$.

12. The positive electrode active material for lithium secondary batteries according to claim 2,
wherein the lithium-containing tungsten oxide is present at primary particle boundaries of the lithium composite metal compound.

13. The positive electrode active material for lithium secondary batteries according to claim 3,
wherein, in the pore distribution of the positive electrode active material for lithium secondary batteries measured by the mercury intrusion method, a pore volume of pores having a pore diameter in a range of 10 nm or more and 200 nm or less is 0.01 mL/g or more and 0.06 mL/g or less.

14. The positive electrode active material for lithium secondary batteries according to claim 3,
wherein the lithium-containing tungsten oxide is at least one of Li$_2$WO$_4$ and Li$_4$WO$_5$.

15. The positive electrode active material for lithium secondary batteries according to claim 3,
wherein the lithium-containing tungsten oxide is present at primary particle boundaries of the lithium composite metal compound.

16. The positive electrode active material for lithium secondary batteries according to claim 4,
wherein the lithium-containing tungsten oxide is at least one of Li$_2$WO$_4$ and Li$_4$WO$_5$.

17. The positive electrode active material for lithium secondary batteries according to claim 4,
wherein the lithium-containing tungsten oxide is present at primary particle boundaries of the lithium composite metal compound.

18. The positive electrode active material for lithium secondary batteries according to claim 5,
wherein the lithium-containing tungsten oxide is present at primary particle boundaries of the lithium composite metal compound.

* * * * *